US009411585B2

(12) United States Patent
Gschwind et al.

(10) Patent No.: US 9,411,585 B2
(45) Date of Patent: Aug. 9, 2016

(54) MULTI-ADDRESSABLE REGISTER FILES AND FORMAT CONVERSIONS ASSOCIATED THEREWITH

(75) Inventors: Michael K. Gschwind, Chappaqua, NY (US); Brett Olsson, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 339 days.

(21) Appl. No.: 13/234,520

(22) Filed: Sep. 16, 2011

(65) Prior Publication Data

US 2013/0073838 A1   Mar. 21, 2013

(51) Int. Cl.
*G06F 9/30* (2006.01)
*G06F 9/302* (2006.01)

(52) U.S. Cl.
CPC ........ *G06F 9/30025* (2013.01); *G06F 9/30014* (2013.01); *G06F 9/3016* (2013.01); *G06F 9/30036* (2013.01); *G06F 9/30098* (2013.01); *G06F 9/30112* (2013.01); *G06F 9/30185* (2013.01)

(58) Field of Classification Search
CPC ............ G06F 9/30025; G06F 9/30014; G06F 9/30096; G06F 9/30112; G06F 9/30098; G06F 9/30036
USPC ........................................................ 712/222
See application file for complete search history.

(56) References Cited

U.S. PATENT DOCUMENTS

| 4,595,911 A | 6/1986 | Kregness et al. |
| 4,748,585 A | 5/1988 | Chiarulli et al. |
| 4,758,585 A | 7/1988 | Butler et al. |
| 5,063,497 A | 11/1991 | Cutler et al. |
| 5,278,840 A | 1/1994 | Cutler et al. |
| 5,278,945 A | 1/1994 | Basehore et al. |
| 5,341,320 A | 8/1994 | Trissel et al. |
| 5,341,506 A * | 8/1994 | Nohmi et al. ................... 712/26 |

(Continued)

FOREIGN PATENT DOCUMENTS

CN   1303501 A   7/2001
DE   69901708 T2   12/2002

(Continued)

OTHER PUBLICATIONS

IEEE Computer Society , "IEEE Standard for Floating-Point Arithmetic", Aug. 2008, IEEE, IEEE Std. 754TM-2008.*

(Continued)

*Primary Examiner* — Andrew Caldwell
*Assistant Examiner* — Yuqing Xiao
(74) *Attorney, Agent, or Firm* — William A. Kinnaman, Jr., Esq.; Matthew M. Hulihan, Esq.; Heslin Rothenberg Farley & Mesiti P.C.

(57) ABSTRACT

A multi-addressable register file is addressed by a plurality of types of instructions, including scalar, vector and vector-scalar extension instructions. It may be determined that data is to be translated from one format to another format. If so determined, a convert machine instruction is executed that obtains a single precision datum in a first representation in a first format from a first register; converts the single precision datum of the first representation in the first format to a converted single precision datum of a second representation in a second format; and places the converted single precision datum in a second register.

16 Claims, 13 Drawing Sheets

(56) References Cited

U.S. PATENT DOCUMENTS

| | | | |
|---|---|---|---|
| 5,390,307 A | 2/1995 | Yoshida | |
| 5,423,051 A | 6/1995 | Fuller et al. | |
| 5,437,043 A | 7/1995 | Fujii et al. | |
| 5,450,607 A | 9/1995 | Kowalczyk et al. | |
| 5,487,022 A | 1/1996 | Simpson et al. | |
| 5,515,520 A * | 5/1996 | Hatta et al. | 708/550 |
| 5,537,606 A | 7/1996 | Byrne | |
| 5,560,035 A | 9/1996 | Garg et al. | |
| 5,623,600 A | 4/1997 | Ji et al. | |
| 5,668,984 A | 9/1997 | Taborn et al. | |
| 5,669,013 A | 9/1997 | Watanabe et al. | |
| 5,675,777 A | 10/1997 | Glickman | |
| 5,685,009 A | 11/1997 | Blomgren et al. | |
| 5,701,508 A | 12/1997 | Glew et al. | |
| 5,751,987 A | 5/1998 | Mahant-Shetti et al. | |
| 5,758,176 A | 5/1998 | Agarwal et al. | |
| 5,761,103 A | 6/1998 | Oakland et al. | |
| 5,768,169 A | 6/1998 | Sharangpani | |
| 5,778,241 A | 7/1998 | Bindloss et al. | |
| 5,805,475 A | 9/1998 | Putrino et al. | |
| 5,822,778 A | 10/1998 | Dutton et al. | |
| 5,825,678 A | 10/1998 | Smith | |
| 5,978,901 A | 11/1999 | Luedtke et al. | |
| 5,995,122 A | 11/1999 | Hsieh et al. | |
| 6,009,511 A | 12/1999 | Lynch et al. | |
| 6,058,465 A | 5/2000 | Nguyen | |
| 6,105,129 A | 8/2000 | Meier et al. | |
| 6,131,104 A | 10/2000 | Oberman | |
| 6,163,764 A * | 12/2000 | Dulong et al. | 703/26 |
| 6,178,482 B1 | 1/2001 | Sollars | |
| 6,185,671 B1 | 2/2001 | Pentovski et al. | |
| 6,192,467 B1 | 2/2001 | Abdallah et al. | |
| 6,195,476 B1 | 2/2001 | Schmid | |
| 6,195,746 B1 | 2/2001 | Nair | |
| 6,199,155 B1 | 3/2001 | Kishida et al. | |
| 6,237,083 B1 | 5/2001 | Favor | |
| 6,263,426 B1 * | 7/2001 | Abdallah et al. | 712/229 |
| 6,282,554 B1 | 8/2001 | Abdallah et al. | |
| 6,282,634 B1 | 8/2001 | Hinds et al. | |
| 6,292,815 B1 | 9/2001 | Abdallah et al. | |
| 6,295,599 B1 | 9/2001 | Hansen et al. | |
| 6,321,327 B1 | 11/2001 | Makineni et al. | |
| 6,332,186 B1 | 12/2001 | Elwood et al. | |
| 6,460,135 B1 | 10/2002 | Suganuma | |
| 6,715,061 B1 | 3/2004 | Wang | |
| 6,792,523 B1 | 9/2004 | Glew et al. | |
| 6,839,828 B2 | 1/2005 | Gschwind et al. | |
| 6,934,830 B2 | 8/2005 | Kadambi et al. | |
| 7,043,627 B2 | 5/2006 | Shimizu et al. | |
| 7,149,882 B2 | 12/2006 | Glew et al. | |
| 7,257,695 B2 | 8/2007 | Jiang et al. | |
| 7,430,656 B2 | 9/2008 | Sperber et al. | |
| 7,849,294 B2 | 12/2010 | Gschwind et al. | |
| 7,877,582 B2 | 1/2011 | Gschwind et al. | |
| 2004/0158741 A1 | 8/2004 | Schneider | |
| 2005/0125630 A1 | 6/2005 | Liao et al. | |
| 2005/0125636 A1 | 6/2005 | Ford et al. | |
| 2005/0289299 A1 | 12/2005 | Nunamaker et al. | |
| 2009/0198966 A1 | 8/2009 | Gschwind et al. | |
| 2009/0198977 A1 * | 8/2009 | Gschwind et al. | 712/226 |
| 2009/0282483 A1 | 11/2009 | Bennett | |
| 2010/0095099 A1 | 4/2010 | Boersma et al. | |
| 2011/0047359 A1 | 2/2011 | Eichenberger et al. | |

FOREIGN PATENT DOCUMENTS

| | | |
|---|---|---|
| EP | 1080420 B1 | 3/1999 |
| GB | 2409063 B | 7/2006 |
| JP | 62249230 A | 10/1987 |
| JP | 2002517037 A | 6/2002 |
| JP | 2004005738 A | 1/2004 |
| JP | 2005174298 A | 6/2005 |
| TW | 413766 B | 12/2000 |
| WO | WO9961996 | 12/1999 |

OTHER PUBLICATIONS

Diefendorff et al., "How Multimedia Workloads Will Change Processor Design," Computer, Sep. 1997, pp. 43-45.

Tremblay et al., "VIS Speeds New Media Processing", IEEE Micro, Aug. 1996, pp. 10-20.

Lee, "Multimedia Enhancements for PA-RISC Processors" Hewlett-Packard Company, HotCHips VI, Aug. 1994, pp. 7.3.1-7.3.10, 183-192.

Conte et al., "Challenges to Combining General-Purpose and Multimedia Processors," Dec. 1997, Computer IEEE, pp. 33-37.

Lee, "Subword Parallelism with MAX-2," Hewlett Packard IEEE Micro, Aug. 1996, pp. 51-59.

Peleg et al., "MMX Technology Extension to the Intel Architecture," IEEE Micro, Aug. 1996, pp. 42-50.

Peleg et al., "Intel MMX for Multimedia PCs," Communications of the ACMM, Jan. 1997, vol. 40, No. 1, pp. 25-38.

Office Action for U.S. Pat. No. 6,839,828 (U.S. Appl. No. 09/929,805) dated Apr. 2, 2004.

Notice of Allowance for U.S. Pat. No. 6,839,828 (U.S. Appl. No. 09/929,805) dated Sep. 13, 2004.

Office Action for U.S. Pat. No. 7,849,294 (U.S. Appl. No. 12/013,768) dated Mar. 15, 2010.

Notice of Allowance for U.S. Pat. No. 7,849,294 (U.S. Appl. No. 12/013,768) dated Jul. 30, 2010.

Office Action for U.S. Pat. No. 7,877,582 (U.S. Appl. No. 12/023,720) dated Mar. 12, 2010.

Final Action for U.S. Pat. No. 7,877,582 (U.S. Appl. No. 12/023,720) dated Aug. 5, 2010.

"Power ISA—Version 2.05," IBM Corporation, Chapters 4, 5 and 6, Oct. 2007, pp. 99-260.

"Power ISA—Version 2.06 Revision B," IBM Corporation, Jul. 2010, pp. 14-21 and 271-502 (Chapter 7).

"Power ISA—Version 2.05," IBM Corporation, Oct. 2007, pp. 1-980.

"Power ISA—Version 2.06 Revision B," IBM Corporation, Jul. 2010, pp. 4,34-1.

"Handling Denormalized Floating-point Operands with Strict Prenormalization Conditions", IP.com No. IPCOM000184042D, Jun. 9, 2009, pp. 1-3.

International Search Report and Written Opinion for PCT/IB2012/054582 dated Jan. 15, 2013, pp. 1-9.

"IEEE Standard for Floating-Point Arithmetic," IEEE Std. 754-2008, USA:IEEE, Aug. 2008, pp. iv-x and 7, 8, 9 and 14.

"Users Manual MC68040," first edition, Japan: Mortorola Inc., 1992 (no further date information available), pp. 1-442.

"A Unified Vector/Scalar Floating Point Architecture," Proceedings of the Third International Conference on Architectural Support for Programming Languages and Operating Systems (ASPLOS-III), USA:ACM, Apr. 1989, pp. 134-143.

International Search Report and Written Opinion for PCT/IB2012/045609 dated Jan. 15, 2013, pp. 1-8.

Intel Corporation, "IA-32 Intel Architecture Software Developer's Manual vol. 3: System Programming Guide," Intel Corporation, 2003, pp. 2-12 thru 2-15 (http://fling.cs.yale.edu/cs422/doc/24547212.pdf).

Lemieux, Joe, "Introduction to ARM Thumb," Princeton University, Sep. 2003, pp. 1-3 (http://www.cs.princeton.edu/courses/archive/fal112/cos375/ARMthumb.pdf).

Notice of Allowance for U.S. Pat. No. 7,877,582 (U.S. Appl. No. 12/023,720) dated Sep. 16, 2010.

Office Action for U.S. Appl. No. 13/234,785 dated Nov. 6, 2013, pp. 1-25.

Examination Report under Section 18(3) for GB1406331.7 dated May 27, 2014, 4 pages.

Final Office Action in U.S. Appl. No. 13/234,785, dated Jul. 22, 2014, 16 pages.

Office Action in U.S. Appl. No. 13/681,520, dated Sep. 9, 2014, 22 pages.

Takayuki Sagishima et al., "Parallel Processing for Computer Graphics," first edition, Japan:Corona Publishing Co., ltd., 1991 (no further date information available), pp. 141-143 (cited as an "A" reference in International Search Report and Written Opinion for PCT/IB2012/054582 dated Jan. 15, 2013, pp. 1-9, previously considered).

(56) References Cited

OTHER PUBLICATIONS

Translated portions of Takayuki Sagishima et al., "Parallel Processing for Computer Graphics," first edition, Japan: Corona Publishing Co., ltd., 1991 (no further date information available), pp. 141-143.
Examination Report in Application No. GB1406331.7, dated Oct. 27, 2014, 3 pages.
Final Office Action in U.S. Appl. No. 13/234,785, dated Oct. 6, 2015, pp. 1-16.
Office Action in U.S. Appl. No. 13/234,785, dated Mar. 4, 2015, pp. 1-23.
Final Office Action in U.S. Appl. No. 13/681,520, dated Mar. 4, 2015, pp. 1-23.
Final Office Action in U.S. Appl. No. 13/716,998, dated May 1, 2015, pp. 1-23.
Intel Architecture Software Developer's Manual vol. 2: Instruction Set Reference, 1999, pp. 3-411, 3-413.
Office Action in U.S. Appl. No. 13/681,520, dated Aug. 31 2015, pp. 1-14.
Freescale Semiconductor, 3200z3 Power Architecture Core Reference Manual, Jun. 2008, Revision, pp. 1-2, 1-7 to 1-8, 2-7 to 2-9, and 3-40 to 3-60.
Office Action in U.S. Appl. No. 13/716,998, dated Dec. 23, 2015, pp. 1-15.
Final Office Action in U.S. Appl. No. 13/681,520, dated Apr. 15, 2016, pp. 1-13.

\* cited by examiner

MULTI-ADDRESSABLE REGISTER FILES AND FORMAT CONVERSIONS ASSOCIATED THEREWITH

BACKGROUND

One or more aspects of the present application relate, in general, to data processing, and in particular, to multi-addressable register files and processing associated therewith.

High-performance processors support multimedia processing using single instruction multiple data (SIMD) techniques for exploiting instruction-level parallelism in programs. That is, SIMD techniques are used for executing more than one operation at a time. These processors contain multiple functional units, some of which are directed to the execution of scalar data and some of which are grouped for the processing of structured SIMD vector data. SIMD data streams are used to represent multimedia data types, such as color information, using, for example, the RGB format by encoding the red, green, and blue components in the structured data type, or coordinate information, by encoding position as the quadruple (x, y, z, w).

Processors designed for processing multimedia data have been implemented by augmenting an existing scalar processor implementation, for instance by adding a SIMD unit, the SIMD unit itself including multiple functional units (i.e., fixed point units and floating point units) mirroring resources available for the processing of scalar data types, and replicating each functional unit type for the number of structured elements to be supported by the SIMD architecture.

Processors that support multimedia processing, as well as other processing, can process data of different types. However, facilities are to be provided to manage such processing.

BRIEF SUMMARY

Shortcomings of the prior art are overcome and additional advantages are provided through the provision of a computer program product for executing a machine instruction. The computer program product comprises a storage medium readable by a processing circuit and storing instructions for execution by the processing circuit for performing a method. The method includes, for instance, obtaining, by a processor, a machine instruction for execution, the machine instruction being defined for computer execution according to a computer architecture, the machine instruction includes, for instance, at least one opcode field identifying a convert instruction; at least one field used to specify a first register; and at least one other field used to specify a second register; executing, by the processor, the machine instruction, the executing including, for instance, obtaining from the first register a single precision binary floating point datum in a first representation in a first format; converting the single precision binary floating point datum of the first representation in the first format to a converted single precision binary floating point datum of a second representation in a second format; and placing the converted single precision binary floating point datum in the second register.

Methods and systems relating to one or more aspects of the present invention are also described and claimed herein. Further, services relating to one or more aspects of the present invention are also described and may be claimed herein.

Additional features and advantages are realized through the techniques of one or more aspects of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of one or more aspects of the invention are apparent from the following detailed description taken in conjunction with the accompanying drawings in which:

DETAILED DESCRIPTION

In accordance with an aspect of the present invention, processing associated with scalar and vector data is facilitated. In one aspect, a register file is provided in which each register of the register file may include 64 bit (b) single precision floating point scalar data or 32b single precision vector data, as well as other data formats. Further, in one aspect, conversion techniques are provided to convert from one single precision floating point format to another single precision floating point format. In one example, the conversion is performed using architected instructions and without signaling an exception.

As discussed earlier above and further in commonly assigned U.S. Publication No. 2009/0198966 A1, Gschwind et al., entitled "Multi-Addressable Register File," published Aug. 6, 2009 and U.S. Pat. No. 7,877,582, Gschwind et al., entitled "Multi-Addressable Register File," issued Jan. 25, 2011, each of which is hereby incorporated herein by reference in its entirety, processors designed for processing multimedia data have typically been implemented by augmenting an existing scalar processor implementation, for instance, by adding a SIMD unit, the SIMD unit itself including multiple functional units (i.e., fixed point units and floating point units) mirroring resources available for the processing of scalar data types, and replicating each functional unit type for the number of structured elements to be supported by the SIMD architecture. Often, the only units shared between the scalar and SIMD processing units are the issue logic, which issues instructions to either the scalar or SIMD processing blocks, and the load/store unit (LSU), which governs access to the memory subsystem. All other units, including the register files, are typically maintained separately.

Figure 1:
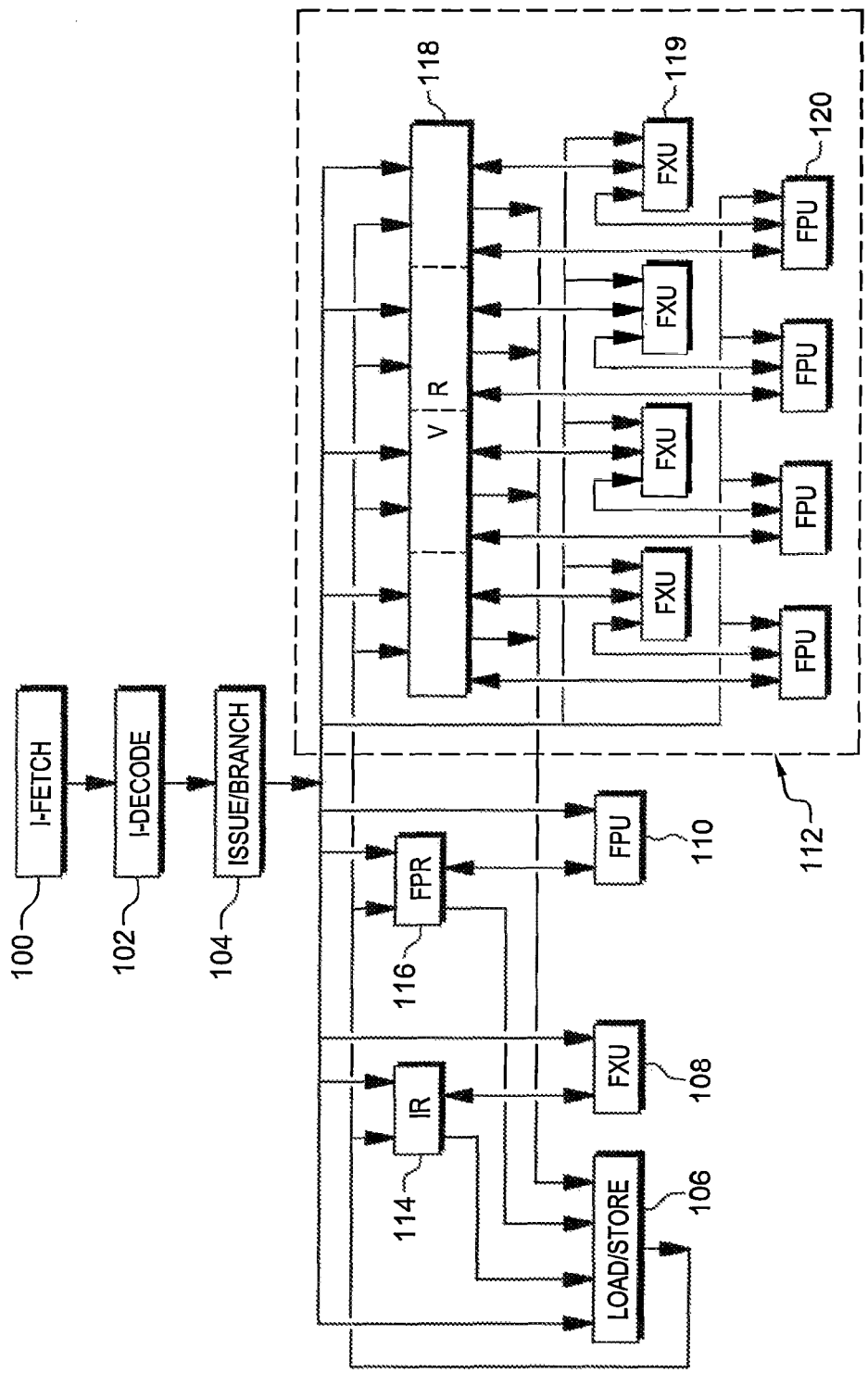
FIG. 1 is a block diagram depicting an example of a processor including both scalar processing units and a SIMD unit for processing structured data types.

FIG. 1 is a block diagram depicting an example of a prior art processor containing both scalar processing units and a SIMD unit for processing structured data types, the SIMD unit comprising multiple processing units for each element in the structured data type. In general, the use of separate scalar and SIMD processors is inefficient and expensive in that such a configuration includes a number of redundant functional units and data paths. Furthermore, such implementations result in an undesirable amount of power consumption since while either the scalar or SIMD unit is processing data, the other is generally sitting idly by, awaiting its next instruction, but all the while consuming system power.

During operation of the system of FIG. 1, instructions are fetched by instruction fetch unit 100, and supplied to an instruction decode unit 102. Decoded instructions are passed to an issue/branch unit 104, where branch instructions are resolved and other instructions can be stored in the instruction issue unit thereof (not shown) until they can be executed in one of the functional units of the processor. The instruction issue unit can contain prediction logic, instruction reordering logic, instruction issue buffers and other logic supporting the high-performance issuing of instructions.

Instructions are issued by the issue/branch unit 104 to one or more of the load/store unit 106, the fixed-point unit (FXU) 108, the floating-point unit (FPU) 110, or the SIMD processing block 112. Before instructions can be processed by one or more of the processing units, one or more register accesses are usually required in a register file, e.g., the integer register file 114, the floating point register file 116, or the vector register file 118, which is a part of the SIMD multimedia extension found in many contemporary processors.

The SIMD multimedia processing block 112 typically contains a vector register file 118 for storing structured data (usually a vector having four elements). The vector register file 118 may be segmented into four sub-register files, each storing a single field of the structured data. The SIMD multimedia processor block 112 may contain several types of function units, each type being replicated for the number of elements in the structured data type supported by the multimedia extension. In FIG. 1, there are shown fixed point units 119 and floating point units 120 replicated four times to process one structure element each as can be found in the PowerPC® VMX multimedia extension.

It can be seen that, where both scalar and SIMD instruction execution are provided, separately addressable register files are typically required for the various types of instructions that may be encountered by the CPU. For example, as shown in FIG. 1, a separate integer register file 114, floating point register file 116, and vector register file 118 are provided. Having separate registers files in this manner is expensive in terms of overhead as well as power consumption. Having multiple register files means that as code is executed, the code is to switch or move between the various register files. This makes code generation expensive in terms of the overhead associated with moving between the various register files. Moreover, a compiler of the code may require more of one or another set of resources associated with the register files leading to register file fragmentation. Furthermore, having separate resources in the micro-architecture of the CPU increases the costs associated with fabrication of the CPU, as well as costs associated with power consumption, heat dissipation, etc.

The above-described processor implementation is one example of prior art systems; in some implementations, some register files may be shared, e.g., a combined integer and floating point register file, or additional register files may be present, such as a condition register file or a predicate register file for comparison results. In one particular example described in U.S. Pat. No. 6,839,828, Gschwind et al., entitled "SIMD Datapath Coupled to Scalar/Vector/Address/Conditional Data Register File with Selective Subpath Scalar Processing Mode," issued Jan. 4, 2004, which is hereby incorporated herein by reference in its entirety, a combined scalar/vector addressable register file is described, along with a processor designed to operate in a plurality of modes for processing vector and scalar instructions. A parallel vector unit, coupled to the register files, includes functional units configurable to operate in a vector operation mode and a scalar operation mode. The vector unit includes an apparatus for tightly coupling the functional units to perform an operation specified by a current instruction. Under a vector operation mode, the vector unit performs, in parallel, a single vector operation on a plurality of data elements. The operations performed on the plurality of data elements are each performed by a different functional unit of the vector unit. Under a scalar operation mode, the vector unit performs a scalar operation on a data element received from the register files in a functional unit within the vector unit.

While the mechanism of U.S. Pat. No. 6,839,828 provides the ability to store different types of instructions/data in the register file, in order to achieve this ability, the '828 patent sets forth a new architecture. This new architecture, however, does not provide for multi-addressability, i.e. different ways of addressing registers in the register file based on the instruction type, e.g., legacy scalar, legacy vector, or a new instruction type.

One or more illustrative embodiments described herein, as well as in U.S. Pat. No. 7,877,582, provide a multi-addressable register file. Such a multi-addressable register file may be implemented in a processor of a data processing system. Such a data processing system may have one or more processors in which each processor, or a subset of processors, may implement the multi-addressable register file of the illustrative embodiments. The types of data processing systems in which processors have a multi-addressable register file in accordance with one or more illustrative embodiments may vary considerably, and thus, the present description cannot address each such possible processor architecture. However, for purposes of illustration, FIG. 2 is provided as an example of one type of data processing system in which the multi-addressable register file of one or more illustrative embodiments may be implemented.

Figure 2:
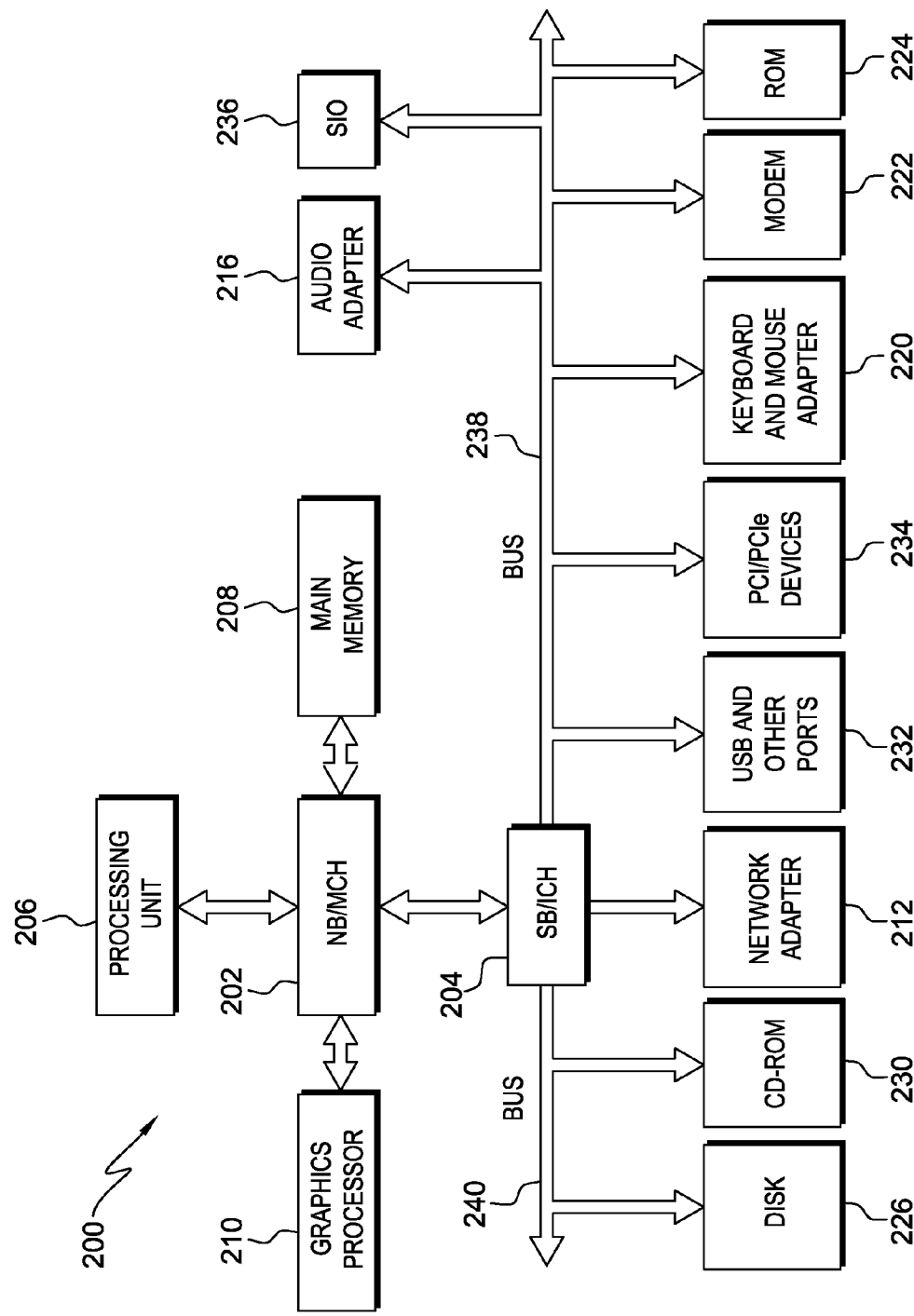
FIG. 2 is one example of a data processing system in which one or more aspects of illustrative embodiments may be implemented.

With reference now to FIG. 2, a block diagram of an exemplary data processing system is shown in which aspects of one or more illustrative embodiments may be implemented. Data processing system 200 is an example of a computer, in which computer usable code or instructions implementing the processes for one or more illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both) or the Linux® operating system (Linux is a trademark of Linus Torvalds in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the Linux® operating system (eServer, System p® and AIX are trademarks of International Business Machines Corporation in the United States, other countries, or both). Data processing system 200 may be a symmetric multiprocessor (SMP) system including a plurality of processors, such as the POWER® processor available from International Business Machines Corporation of Armonk, N.Y., in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for one or more illustrative embodiments may be performed by processing unit 206 using computer usable program code, which may be located in a memory, such as, for example, main memory 208, ROM 224, or in one or more peripheral devices 226 and 230, for example.

A bus system, such as bus 238 or bus 240, as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache, such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of one or more illustrative embodiments may be applied to a multiprocessor data processing system, other than the SMP system mentioned previously, without departing from the spirit and scope of one or more aspects of the present invention.

Moreover, data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As discussed above, one or more illustrative embodiments provide a multi-addressable register file. One or more illustrative embodiments improve upon known register files by increasing the capability of the register file by providing a large number of registers and an ability to address a first subset of registers with a first set of instructions, address a second subset of registers with a second set of instructions, and to address the entire register file with at least a third set of instructions. In accordance with one or more illustrative embodiments, the first and second subsets of registers are non-overlapping and refer to distinct register file areas, such as "registers for instructions of type 1" and "registers for instructions of type 2." A register contained within the subset corresponding to instructions of type 1 cannot be accessed by instructions of type 2, and vice versa. In one illustrative embodiment, the type 1 instructions correspond to IBM Power Architecture FPU, or legacy floating point instructions, the type 2 instructions correspond to IBM Power Architecture legacy VMX instructions, and the type 3 instructions correspond to IBM Power Architecture VSX instructions.

The mechanisms of one or more illustrative embodiments differ from known clustered register files, operand subranges within register files, processors with "move between register file" instructions, and VMX128 register files, which uses a form of subranges with non-contiguous register specifiers. With operand subranges, typically there is one subrange for one operand only, i.e. one type of instruction. There is no other instruction type that has another form that may address all registers in the register file and there is no other range of registers for another type of instructions, i.e. there is no multi-addressability functionality. Clustered register files comprise a large register file with sub-ranges addressable by different instructions, but there is no instruction type that may address all of the registers in the register file. To the contrary, if operations are to be performed on the full set of registers, then move/copy operations are to be performed on the register file.

These move/copy operations are usually slower operations that may require special scheduling mechanisms.

In contradistinction, one or more illustrative embodiments provide access to the registers of the multi-addressable register file based on the instruction type, e.g., legacy floating point, legacy scalar, vector-scalar, enhanced or extended vector-scalar, etc. Rather than one subset of registers associated with one operand type, the multi-addressable register file of one or more illustrative embodiments provides multiple disjointed subsets of registers. The multiple subsets of registers, in the multi-addressable register file, associated with the various types of instructions are contiguous ranges of registers. Moreover, with one or more illustrative embodiments, while instructions of different types may access non-overlapping subsets of registers in the multi-addressable register file, at least one type of instruction may also access all of the registers in the multi-addressable register file.

In one particular embodiment, in accordance with an aspect of the present invention, instructions of different types may access non-overlapping subsets of registers in the multi-addressable register file and multiple types of instructions (e.g., 64b scalar single precision floating point instructions and 32b vector single precision floating point instructions) may access all of the registers in the multi-addressable register file.

In another aspect of the present invention, one or more illustrative embodiments extend known scalar/vector register files by including an ability to execute scalar, vector, and floating point instructions using the same register file with the portion of the register file to be accessed being dynamically determined based on the type of instruction being executed. Since one or more illustrative embodiments improve upon known scalar/vector register files, and the processors that use such scalar/vector register files, an understanding of the basic operation of such a processor and scalar/vector register file is provided. The following description of FIGS. 3A and 3B reference commonly assigned U.S. Pat. No. 6,839,828 as an example of such a known scalar/vector register file and processor.

Figure 3A:
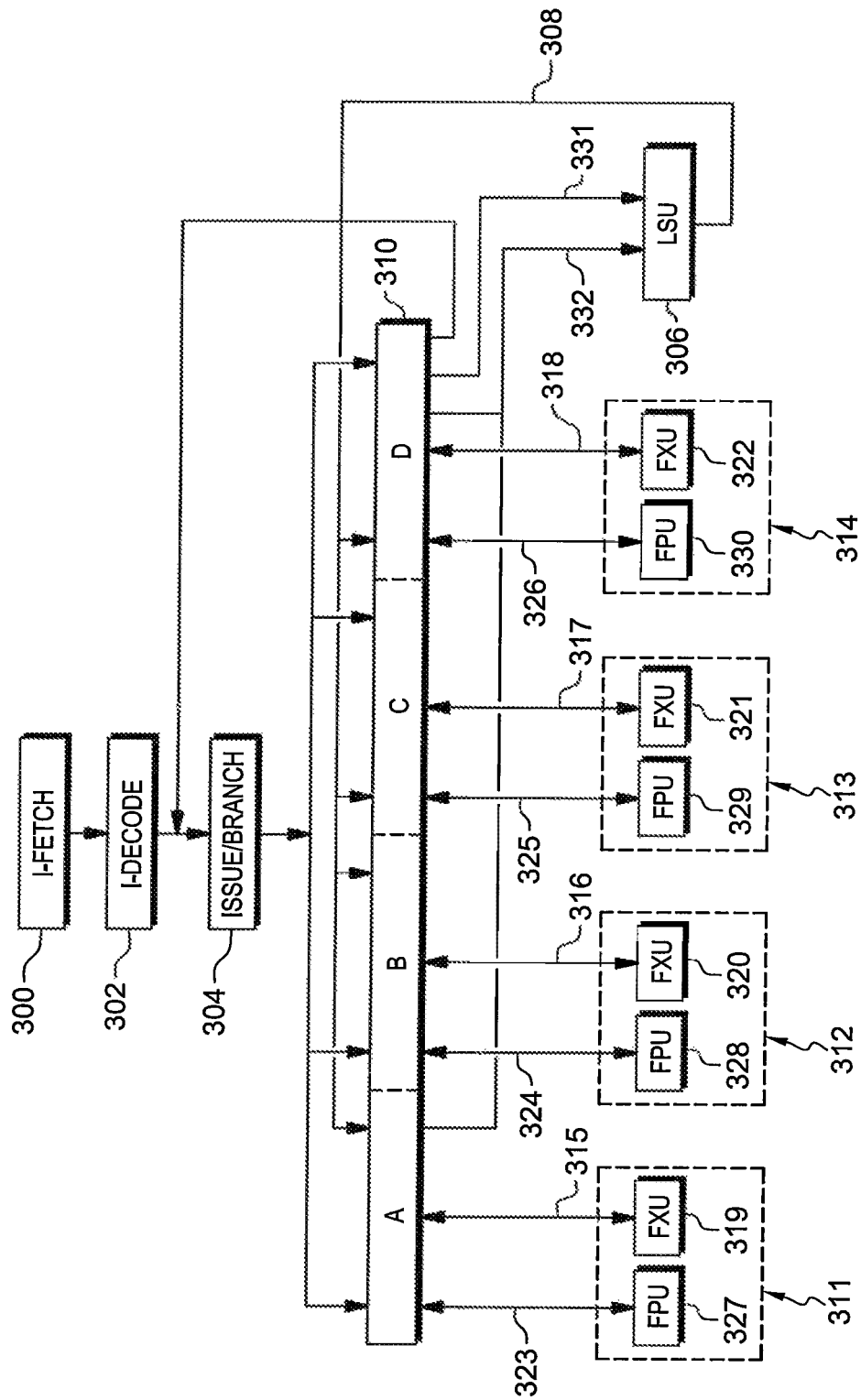
FIG. 3A is one example of a processor designed to execute both scalar and vector instructions using a register file storing both scalar and vector data and address information.

FIG. 3A is one example diagram of a processor designed to execute both scalar and vector instructions using a register file storing both scalar and vector data and address information in accordance with U.S. Pat. No. 6,839,828. In the processor shown in FIG. 3A, scalar and SIMD data path processing capabilities have been combined with the SIMD vector data path now subsuming scalar processing. Scalar processing occurs in one of the units used for processing one element of a vector data type. This data unit is designated the "preferred slot" and provides addresses for the branch unit and the load/store unit, as will be described below. For simplicity, the depiction of the unified processor in FIG. 3A includes data flow connections only, and not control signal connections and external system interfaces, e.g., address lines, connections with memory, etc. The latter connections are assumed.

The unified processor of FIG. 3A includes an instruction fetch unit 300, which fetches instructions and data from the system's memory hierarchy (not shown) based upon the value of the fetch unit's program counter. Fetched instructions are provided by instruction fetch unit 300 to instruction decode unit 302, where they are decoded and expanded into appropriate control signals for controlling downstream units. The expanded instruction is passed to issue/branch unit 304, where it is placed into an instruction queue to await availability of appropriate functional units for processing. In the event that the instruction is a branch, control is returned to instruction fetch unit 300, which fetches the branch-target instruction, and the above process is repeated.

In the case of a scalar operation, when a functional unit (i.e., fixed point unit or floating point unit) becomes available or in the case of a vector operation, when multiple functional units become available, the issue/branch unit 304 issues the instruction to the one or more functional units. Before computation can be performed, source operand data is retrieved by accessing a scalar-vector register file (SVRF) 310. Multiple types of function units are typically provided, e.g., fixed point units, floating point units, and a load/store unit (LSU) 306, the latter fetching from and storing to the memory hierarchy the data identified by the current instruction. The LSU 306 stores the result of memory accesses back to the combined SVRF 310 via bus 308. In this embodiment, SVRF 310 stores data lines consisting of four scalar data words, each line being partitioned such that each of the four data words is associated with a different functional unit pair (or set) 311-314, each functional unit pair including a fixed point unit and a floating point unit, as shown. The functional unit pairs make up what is referred to herein as a parallel vector unit.

Issue logic directs the SVRF 310 to pass the contents of a data line to the appropriate functional unit within each set of functional units, for processing. There may be any number and type of functional units associated with an issue slot, including, but not limited to, fixed-point unit, floating-point unit, comparison unit, logical operation unit, shift unit, etc. The particular functional unit within the set that will use the data word will depend on the instruction to be executed, and is controlled by a signal from issue/branch unit 304. Thus, if the instruction requires the fixed point units to operate on the data, data will be passed to fixed point units 319-322 via lines 315-318. If the instructions require floating point units 327-330, data will be passed via lines 323-326. If other functional unit types were present, data would similarly be passed to them. When each designated functional unit has performed its operation on the input data, it passes a result back to SVRF 310, where it is stored until requested by LSU 306, or passed to the functional units for further manipulation.

The operations to be performed by the functional units, and the functional units to perform those operations, are determined by control signals provided by issue/branch unit 304. When an operation directs the LSU 306 to read data from SVRF 310, the data is passed via data bus 332. In addition, the address to which the data is to be stored in memory is passed to LSU 306 via bus 331. In the embodiment of FIG. 3A, address bus 331 passes information from a segment (D) of SVRF 310, which is associated with functional unit pair 314 (this pair being designated a preferred slot, as described later). The preferred slot could be any of the functional units, by either defining them as a preferred slot, or by means of dynamically determining a preferred slot, either by setting a control register, specifying a slot in the instruction word, or by determining it using any other means, e.g., by the issue unit at issue time. The designation of a preferred slot allows for selective powering-down of functional units, resulting in power savings.

To this point, the described operation of the unified processor has applied to both scalar and vector operations. That is, if an operation to be performed is a scalar operation, thus requiring operation and output of only one functional unit pair, the remaining functional unit pairs may nevertheless be directed to perform the same operation on data passed to them from the scalar vector register file. Such an approach allows for simplicity of design, since to require different functional units to simultaneously execute different operations necessarily introduces complicating design considerations. Likewise, for a vector operation, each functional unit pair will perform the same operation (or substantially the same operation as part of a tightly coupled operation, or a combination of tightly coupled operations as specified by a single instruction) on incoming data.

Scalar and vector operations are distinguished by the manner in which associated address information is used, in accordance with the interpretation of the operation. The operation's interpretation may be a direct result of its operation code, that is, different operation codes may be available for different instructions (e.g., "load scalar byte," "load scalar word," "load scalar vector") or may depend on another part of the system, e.g., mode tag bits to interpret a single "load" opcode. Even scalar data spans an address range of bytes (although fewer bytes than a vector) and there are also variations on how load/store may operate.

Unlike other functional units, which are typically assigned to a specific slot within the SVRF 310, the LSU 306 operates on the entire line of data, or a subset thereof, contained within SVRF 310. The LSU 306 operates in either load or store operation mode, depending on the instruction issued by the issue/branch unit 304. In load mode, LSU 306 receives address information from the preferred slot of the SVRF 310 using bus 331, and loads data from the specified address. When a load vector instruction is being executed, the load operation loads an entire line of data from memory to SVRF 310 using bus 308. When a load scalar operation is specified, the load operation will load at least the number of bits corresponding to the size of the scalar type (typically, byte, halfword, word, and so forth). Additional bits may be loaded in accordance with implementation choices, or invalid data, or data initialized to a default value (such as, but not limited to, "0") may be provided for those bits outside the range of the requested data type. In one embodiment, the "load scalar" operation includes an alignment step, wherein a requested scalar value is aligned in the preferred slot before being stored to SVRF 310. In another embodiment, alignment is performed programmatically using a sequence of one or more instructions.

In the store mode of operation, the LSU 306 receives data to be stored from the SVRF 310 by means of bus 332, and address information from the preferred slot of the SVRF 310 using bus 331, and stores data to the specified address.

Figure 3B:
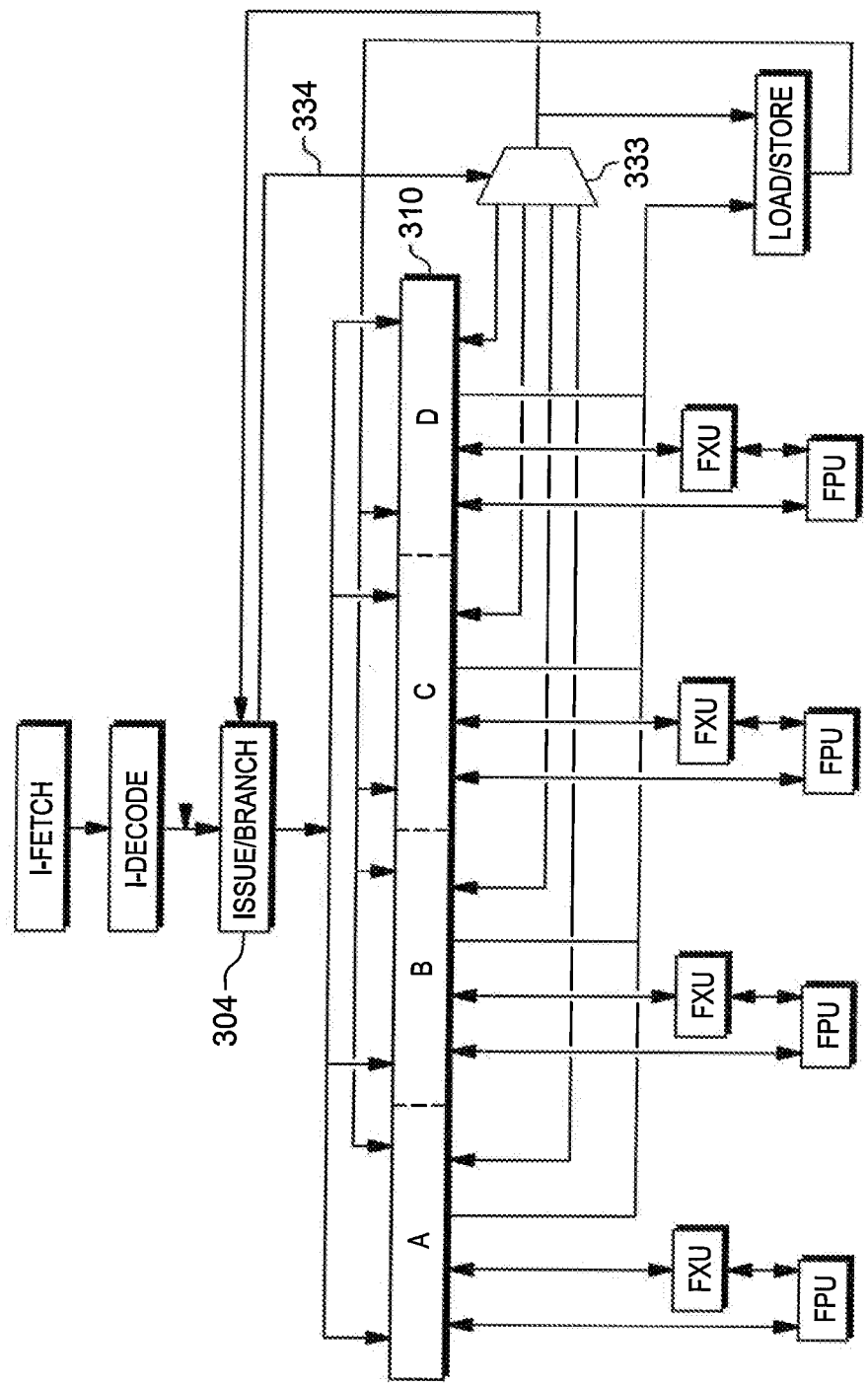
FIG. 3B shows a more flexible approach to selecting scalar data for information as may be used by a branch unit and load/store unit of a processor.

FIG. 3B shows a more flexible approach to selecting scalar data for information as may be used by the branch unit and LSU in accordance with U.S. Pat. No. 6,839,828. In accordance with this embodiment, the various segments of SVRF 310 are selectable by means of a multiplexer 333, which may be controlled with a control input via line 334 from issue/branch unit 304 (which may typically come from a field in the instruction word of the instruction to be executed). Alternate embodiments may include, but are not limited to, a software-controlled special purpose register or a boot-time parameter for supplying the control input of the multiplexer.

The embodiment shown in FIG. 3B operates as follows. When a scalar data value is required by either the load/store unit to supply a memory address for an operation, or by the branch unit to supply, e.g., a branch target address, or a branch condition, or by a shift unit requiring a single shift count to be applied to all elements, or any other unit which may require a scalar data value as its input, the multiplexer 333 is steered by the control input to select one of slots A, B, C, or D as the scalar input for the operation. Thus, in accordance with this embodiment, any of the functional unit pairs can be selected as a "preferred slot", allowing processing operations to be balanced, reduce the need for transfer operations between multiple slots and increase the number of slots in which scalar values can be stored.

Thus, U.S. Pat. No. 6,839,828 describes two different implementations of a preferred slot for scalar processing. The first being a hardwired implementation, wherein the preferred slot is selected at the design phase, and a variable approach, where the preferred slot can be selected on the fly, during execution. As mentioned in the '828 patent, designation of a preferred slot at design time can simplify the implementation in that the above-described selection need not be provided. Moreover, use of identical functional unit pairs may be more efficient, even at the slight overhead cost of having useless circuitry which is never exercised for the preferred slot.

While the register file mechanisms of U.S. Pat. No. 6,839, 828, and other register file mechanisms, allow for a single register file to be used for both scalar and vector operations, these register file mechanisms do not provide multi-addressability, but only the ability to store different types of instructions/data in a single register file. A complex architecture and/or operations have been provided for handling the different types of instructions/data in the single register file.

In contrast, one or more illustrative embodiments provide a multi-addressable register file that permits both legacy instructions and one or more new or enhanced types of instructions to access the registers of the multi-addressable register file. With the mechanisms of one or more illustrative embodiments, a single register file may be addressed using both scalar and Single Instruction Multiple Data (SIMD) or vector instructions. That is, subsets of registers within a multi-addressable register file according to one or more illustrative embodiments, are addressable with different instruction forms, e.g., scalar instructions, SIMD or vector instructions, etc., while the entire set of registers may be addressed with yet another form of instructions, referred to herein as Vector-Scalar Extension (VSX) instructions. The types of operations, i.e. the operation set, that may be performed on the entire set of registers using the VSX instruction form is substantially similar to that of the operation sets of the subsets of registers.

The multi-addressable register file of one or more illustrative embodiments allows legacy instructions to access subsets of registers within the multi-addressable register file while new or enhanced instructions, e.g., the VSX instructions, may access the entire range of registers within the multi-addressable register file. Moreover, the data formats of the legacy instructions are compatible with the data formats of the VSX instructions. Thus, data generated by legacy instructions may be processed by the VSX instructions and vice versa.

For example, one or more illustrative embodiments allow legacy floating point instructions (scalar operations) to work on values stored in a first subset of registers of a register file, e.g., VSX registers 0-31; legacy VMX instructions (vector operations) to work on a second subset of registers in the register file, e.g., VSX registers 32 to 63 (while continuing to refer to registers 0 to 31 in the actual instructions); and VSX instructions (vector-scalar operations) to operate on all of the registers of the register file, e.g., VSX registers 0 to 63. One or more of the illustrative embodiments further allow instructions of different types to share data using the various subsets of registers and the ability of the VSX instructions to access all of the registers of the register file. For example, data may be shared between VSX and legacy floating point instructions by storing and accessing data in VSX registers 0 to 31. Similarly, one or more illustrative embodiments allow data to be shared between legacy VMX instructions and VSX instructions in VSX registers 32 and 63, while continuing to execute programs that use either one or both of legacy floating point and legacy VMX instructions without any modification. Moreover, one or more illustrative embodiments permit linking code modules that use either one or both of legacy floating point and legacy VMX instructions without any modification to code modules that employ the new VSX instructions as well as share data between code modules computing with legacy instructions and those using VSX instructions.

In one particular embodiment, in accordance with an aspect of the present invention, the VSX instructions include 64b scalar single precision floating point instructions and 32b vector single precision floating point instructions, as well as possibly other instructions. Examples of 64b scalar single precision floating point instructions are described in RFC02182.r6: VSX Scalar Single-Precision included as part of the publication of the as-filed instant application, published on Mar. 21, 2013 as U.S. Patent Pub. No. 2013/0073838 A1, which is hereby incorporated herein by reference in its entirety.

Figure 4:
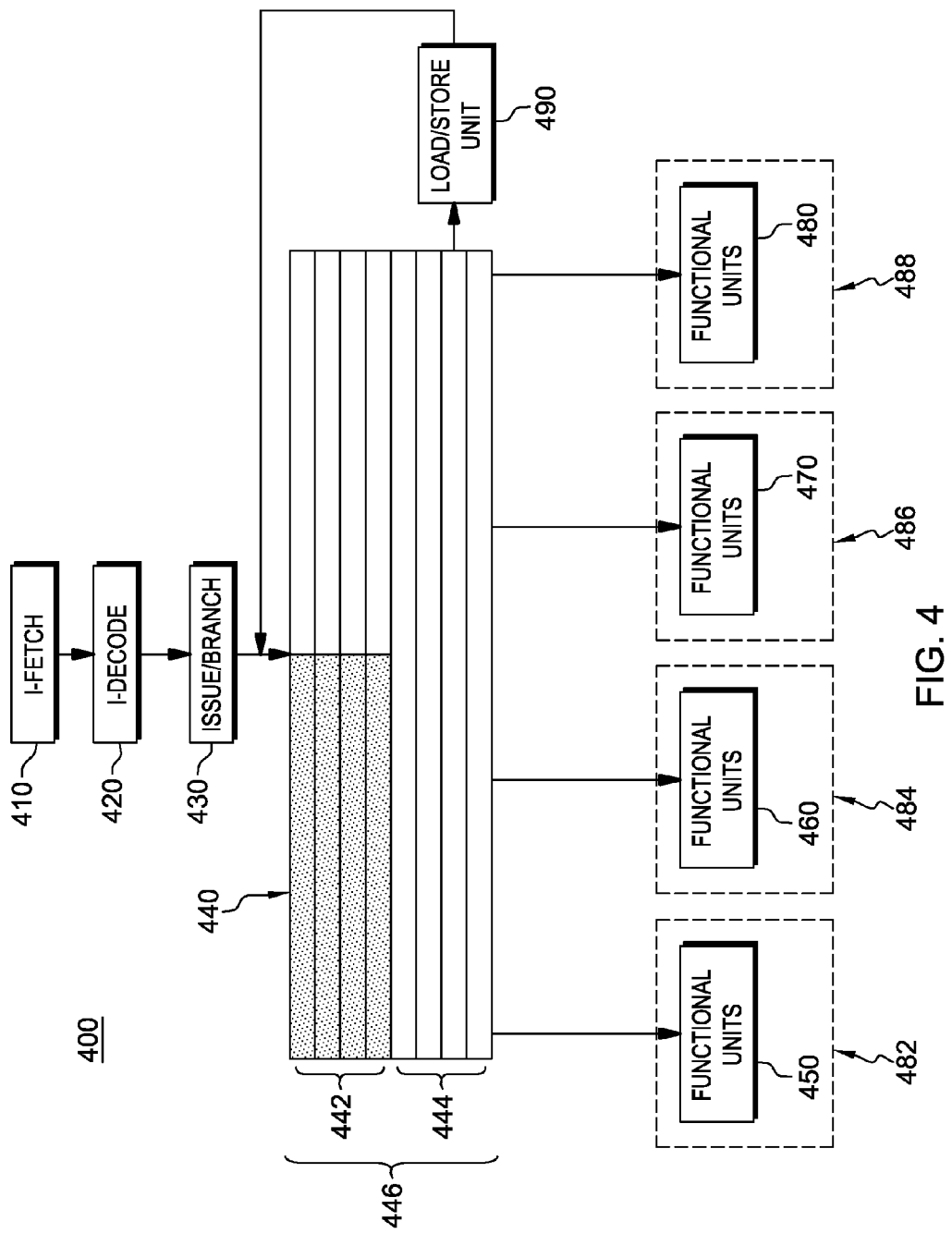
FIG. 4 is one example of a processor in which a multi-addressable register file is utilized in accordance with one illustrative embodiment.

FIG. 4 is one example of a diagram of a processor in which a multi-addressable register file is utilized in accordance with one illustrative embodiment. As shown in FIG. 4, the processor 400 is similar in configuration to the processor of FIG. 3A with the exception of the configuration and utilization of the register file 440. The instruction fetch unit 410, issue/branch unit 430, functional units 450-480 of the functional unit pairs (or sets) 482-488, and load/store unit 490 all operate in a similar manner as described above with regard to FIG. 3A. The instruction decode unit 420 has additional logic, as described hereafter, that is used to decode instructions of three different types: vector, scalar, and a vector-scalar instruction type. In one illustrative embodiment, these three different types of instructions are vector multimedia extension (VMX) instructions, floating point (FP) instructions, and Vector-Scalar Extension (VSX) instructions. FP operations are generally known in the art. VMX instructions are used in the POWER 6 processor, available from International Business Machines Corporation of Armonk, N.Y. and provide single instructions that operate on multiple data elements. VSX instructions will be described in greater detail hereafter.

Based on the decoded instructions, the instruction will access either a sub-range of the register file 440 or the entire range of registers in the register file 440. If the instruction is determined by the instruction decode unit 420 to be a legacy floating point instruction, then a first sub-range 442 of the register file 440 is accessed, with the data being provided to appropriate functional units 450-480 for processing. If the instruction is determined by the instruction decode unit 420 to be a legacy VMX vector instruction, then a second sub-range 444 of the register file 440 is accessed, with the data again being provided to appropriate functional units 450-480 for processing. If the instruction is determined by the instruction decode unit 420 to be a VSX instruction, then the entire range 446 of the register file 440 may be accessed, with the data being provided to appropriate functional units 450-480 for processing. Depending on the particular VSX instruction being executed, a VSX instruction accessing any of registers 446 can use either the entire width of the register to obtain input data (corresponding to a VSX vector instruction and providing access to all registers of register file 446 in each of the operand positions of the instruction), or a portion thereof (corresponding to a VSX scalar instruction and providing access to all registers of register file 446 in each of the operand positions of the instruction, but using only a subset of bits contained therein)

The first sub-range 442 comprises a first range of bits of a first set of registers in the register file 440. The second sub-range 444 comprises a second range of bits of a second set of registers in the register file. The third range 446 comprises an entire range of bits of the entire set of registers in the register file 440. In this way, a single register file 440 may be used to process both legacy scalar and legacy vector instructions, as well as a combined set of vector-scalar instructions, referred to herein as VSX instructions.

VSX instructions are instructions that can access the entire set of registers of a register file 440. The VSX instruction set includes several classes of instructions, including single precision scalar floating point instructions accessing a 32-bit subrange of each register of the entire register file 440; single precision scalar floating point instructions accessing a 64-bit subrange of each register of the entire register file 440; double precision scalar floating point instructions accessing a 64-bit subrange of each register of the entire register file 440; and vector instructions accessing the entire range of bits in the entire register file 440. The VSX instructions use a selected type of register specifier, e.g., a 6 bit register specifier as opposed to a legacy 5 bit specifier that is used by legacy scalar and legacy vector instructions.

Thus, one or more illustrative embodiments provide a single scalar/vector architecture for a register file that is compatible with legacy architectures having separate scalar and vector register files. One or more illustrative embodiments further allow sharing of the storage space of the processor between legacy register files and expanded vector-scalar register files without leading to increased chip area. Moreover, one or more illustrative embodiments allow data sharing between legacy programs and libraries using legacy instructions, and programs and libraries (using either legacy or new/enhanced instructions), as well as interoperation of code, thereby protecting investment in code tuning of legacy applications and avoiding the need to recode all applications to use the new/enhanced instructions while allowing the new/enhanced instructions to be used where they are most profitable. As a result, the expensive overhead experienced by known processor architectures that utilize separate register files for scalar and vector, e.g., single instruction multiple data (SIMD) instructions, as well as the additional costs involved with complex new architectures for handling both scalar and vector instructions using a single register file, may be avoided.

The register file 440 is comprised of a plurality of vector-scalar registers (VSRs), each VSR having a plurality of bits. For example, the register file 440 may be comprised of 64 VSRs numbered VSR[0] to VSR[63], with each VSR having 128 bits numbered 0 to 127. For representation purposes, it will be assumed that VSRs are numbered consecutively from the top to the bottom of the register file 440 with bits being numbered consecutively from left to right of the register file 440. This is shown in FIG. 5 discussed hereafter.

Figure 5:
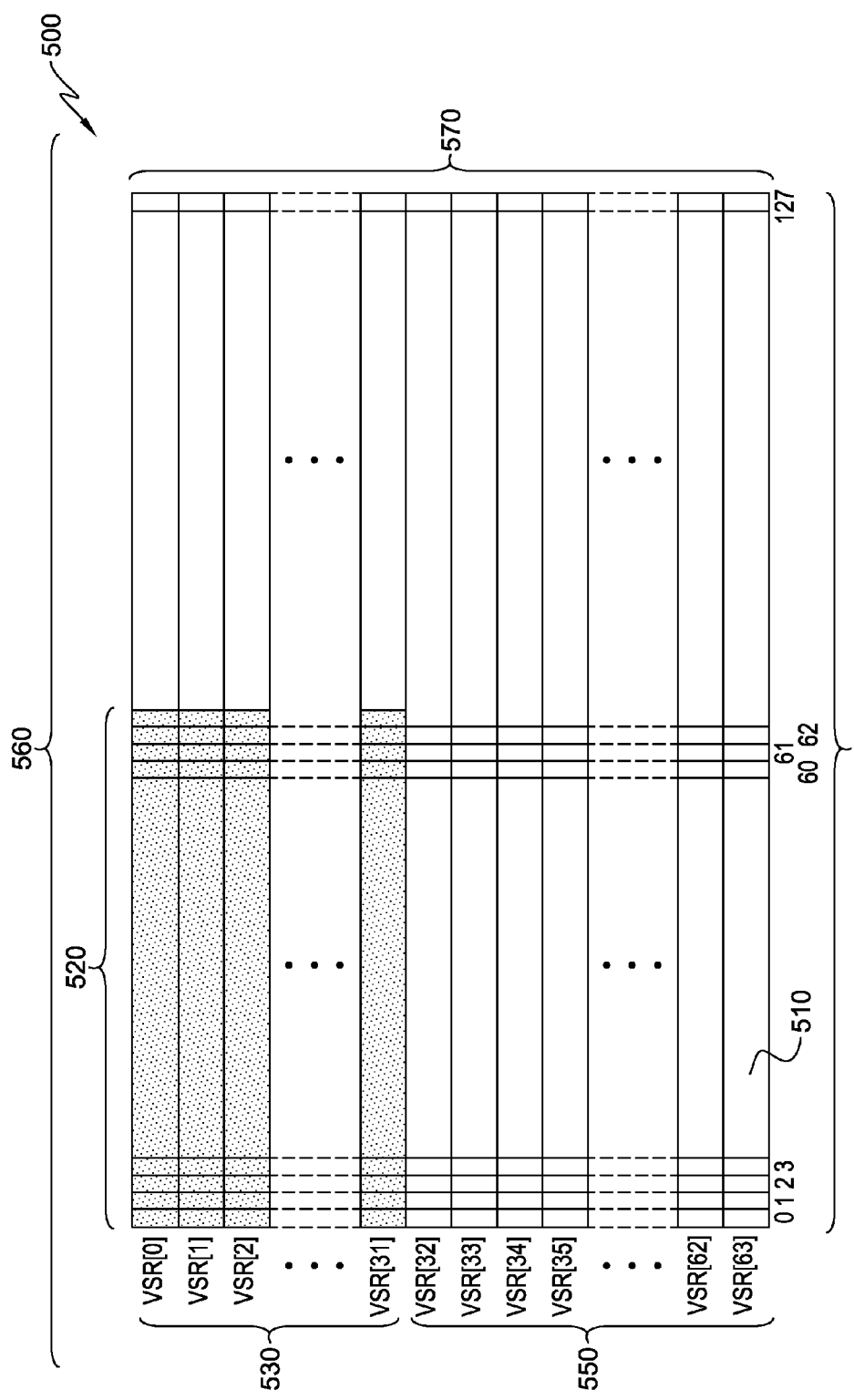
FIG. 5 is one example of a Vector-Scalar Extension (VSX) register file, in accordance with one illustrative embodiment.

FIG. 5 is an exemplary diagram of a Vector-Scalar Extension(VSX) register file in accordance with one illustrative embodiment. The VSX register file 500 of FIG. 5 may be utilized as register file 440, for example. As shown in FIG. 5, the VSX register file 500 includes a plurality of vector-scalar registers (VSRs) 510 numbered VSR[0] to VSR[63]. Each of the VSRs 510 has a predetermined number of bits that may be set. In the depicted example, each VSR 510 has 128 bits numbered 0 to 127 for storing data corresponding to instructions, such as for parameter passing.

A first sub-range of bits 520 in a first set of registers 530 of the register file 500 is associated with a first type of instruction, such as a scalar or floating point instruction. A second sub-range of bits 540 in a second set of registers 550 in the register file 500 is associated with a second type of instruction, such as a vector, SIMD, or VMX instruction. A third range of bits 560 in the entire set of registers 570 of the register file 500 is associated with a third type of instruction, such as a VSX instruction.

It can be appreciated from FIG. 5 that the VSX register file 500 differs from other register files in other systems by allowing three different types of instructions to access registers of the VSX register file 500 based on associated register ranges and bit widths within the registers. Other register files require that the entire register file be accessed in the same manner for all types of instructions by specifying the register to be accessed with respect to the entire set of registers 570 rather than with respect to a subset of registers that corresponds to all operands of a specific instruction type.

With the VSX register file 500, when a legacy scalar operation is to read/write data from/to the VSX register file 500, in one illustrative embodiment, the scalar data value is read/written from/to the left side of the register width, i.e. bits 0 to 63 of registers VSR[0] to VSR[31], for example first sub-range 520. There are a number of ways writing of scalar values to the vector-scalar registers (VSRs) may be accomplished with the illustrative embodiments. In one illustrative embodiment, all of the bits of the VSR may be written with the scalar value being written to bits 0 to 63, while values corresponding to the result of a vector computation being performed for the bits not corresponding to the scalar data value, on the registers specified by the scalar instruction, are written to the bits 64 to 127. For example, if the data values of registers F0 and F1 are added to give a result in register F3, the value of VSR3 in bits 64 to 127 might correspond as if a vector operation had been performed on the bits 64 to 127 of VSR0 and VSR1.

In another illustrative embodiment, the scalar value that is to be written to bits 0 to 63 may be replicated in bits 64 to 127. This approach may be beneficial, for example, when a scalar floating point value should later be combined with a vector value, e.g., when multiplying a vector by a scalar value. Normally the scalar value has to first be replicated across an entire register, such as with a "splat" instruction of the VMX or VSX instruction sets. This approach would eliminate the need for performing a "splat" instruction since the scalar value is already replicated.

In still another illustrative embodiment, the scalar value may be written to bits 0 to 63 of the register while whatever values that were present in bits 64 to 127 may remain unchanged. Such an approach may be used when a vector operation may need to be decomposed into a sequence of scalar operations, where each scalar result could be inserted into a specific vector element, ultimately creating a vector result from the multiple scalar results. This would be the lowest power embodiment since, when nothing needs to be written to the registers, nothing is written. However, it may lead to indeterminism, because the value present in the entire register may now be dependent on what value was resident in the register file prior to a scalar result being written. This is particularly problematic for architectures with register renaming, where the value present in the rename register is highly unpredictable.

In another illustrative embodiment, the scalar value may be written to bits 0 to 63 of the register while the remaining bits 64 to 127 may be filled with a default value, e.g., a zero. Such an approach may be used when a vector operation may need to be decomposed into a sequence of scalar operations, where the multiple scalar results are shifting and ORed together to form a vector result. This approach gives a predictable value, thus avoiding the problems associated with not writing anything. This option further represents lower load on the result bus than replicating the value (because that value does not have to be provided to 2 locations in the register which double the load).

For legacy vector, SIMD, or VMX instructions, the data values are read from/written to the entire range of bits 0 to 127 of the second set of VSRs [32] to [63]. For the new VSX instructions, data values are read from/written to the entire range of bits 0 to 127 of the entire set of VSRs [0] to [63]. With these VSX instructions, scalar values are written in the left side bits 0 to 63 of the registers, while vector values are written across all of the bits 0 to 127.

Thus, with the mechanisms of one or more illustrative embodiments, when decoding instructions, there are really two characteristics of the instructions that are to be decoded. First is the width of the data access, i.e. the access width specification, and second is the register specifier. The access width specification identifies which bits of a register are to be read/written. The register specifier identifies which subset of registers, or the entire set of registers, in the multi-addressable register file that are to be read/written. The primary requirement for decoding the instruction is the register specifier which allows the multi-addressability aspect of overlaying the legacy smaller register files on top of the vector-scalar register file to allow storage sharing.

Referring again to FIG. 4, as discussed above, decoding logic is added to instruction decode unit 420 of processor 400 for handling the three types of instructions using the single register file of the illustrative embodiments. The decoding logic determines the type of instruction and, based on the type of instruction, generates a width specifier for specifying the bit width of the registers in the register file 440 that may be accessed by the instruction. A full specifier for the entire register width is then generated based on the type of instruction and the width specifier, and registers within a corresponding subset of registers 442-446 in the register file 440 are then addressed using the full specifier. Results of the operation are then computed based on the addressing of the subset of registers 442-446 using the full specifier with results of the operation being written back to the subset of registers 442-446 in the register file 440.

In accordance with one illustrative embodiment, there is provided an implementation of the Power Architecture (also known under the names of "PowerPC®" and "Power ISA™") including at least a first set of instructions of "Category: Floating-Point" (FPU, or legacy FPU), a second set of instructions of "Category: Vector" (VMX), and a third set of instructions of "Category: VSX" in accordance with specifications set forth in the Appendices included in U.S. Pat. No. 7,877,582 (U.S. Publication No. 2009/0198966A1), each of which is hereby incorporated herein by reference in its entirety; the documentation that is a part of the publication of the as-filed instant application, published on Mar. 21, 2013 as U.S. Patent Pub. No. 2013/0073838 A1, which is hereby incorporated herein by reference in its entirety; and in the following publications: "Power ISA™ Version 2.05," Chapters 4, 5 and 6, International Business Machines Corporation, Oct. 23, 2007, and "Power ISA™ Version 2.06 Revision B", Chapter 7, International Business Machines Corporation, Jul. 23, 2010, each of which is hereby incorporated herein by reference in its entirety. Each of "Power ISA™ Version 2.05", International Business Machines Corporation, Oct. 23, 2007, and Power ISA™ Version 2.06 Revision B", International Business Machines Corporation, Jul. 23, 2010, is hereby incorporated herein by reference in its entirety.

Detailed information regarding floating point processor facilities is provided in "Power ISA" Version 2.05—Chapter 4—Floating-Point Processor [Category: Floating-Point]".

Detailed information regarding a VMX processor facility is provided in Power ISA™ Version 2.05—Chapter 6—Vector Processor [Category: Vector]". Detailed information regarding a VSX processor facility is provided in Power ISA™ Version 2.06 Revision B—Chapter 7—Vector-Scalar Floating-Point Operations [Category: VSX]", which is hereby incorporated herein by reference in its entirety, as well as in "RFCO2182.r6: VSX Scalar Single-Precision" and "Chapter 7: Vector-Scalar Floating Point Operations [Category: VSX]" included as part of the publication of the as-filed instant application, published on Mar. 21, 2013 as U.S. Patent Pub. No. 2013/0073838 A1, which is hereby incorporated herein by reference in its entirety. In accordance with one illustrative embodiment, additional sets of instructions, such as of "Category: Decimal Floating-Point", may be present as detailed in "Power ISA™ Version 2.05—Chapter 5—Decimal Floating-Point [Category: Decimal Floating-Point]", which is hereby incorporated herein by reference in its entirety.

In accordance with an aspect of the present invention, RFCO2182.r6 and Chapter 7 included in the publication of the as-filed instant application, published on Mar. 21, 2013 as U.S. Patent Pub. No. 2013/0073838 A1, which is hereby incorporated herein by reference in its entirety, describe a new set of VSX instructions that include 64b single precision scalar instructions, which differ from the 32b scalar instructions previously provided. The provision of 64b scalar operations enables further compatibility with legacy scalar operations that are also 64*b*.

Figure 6:
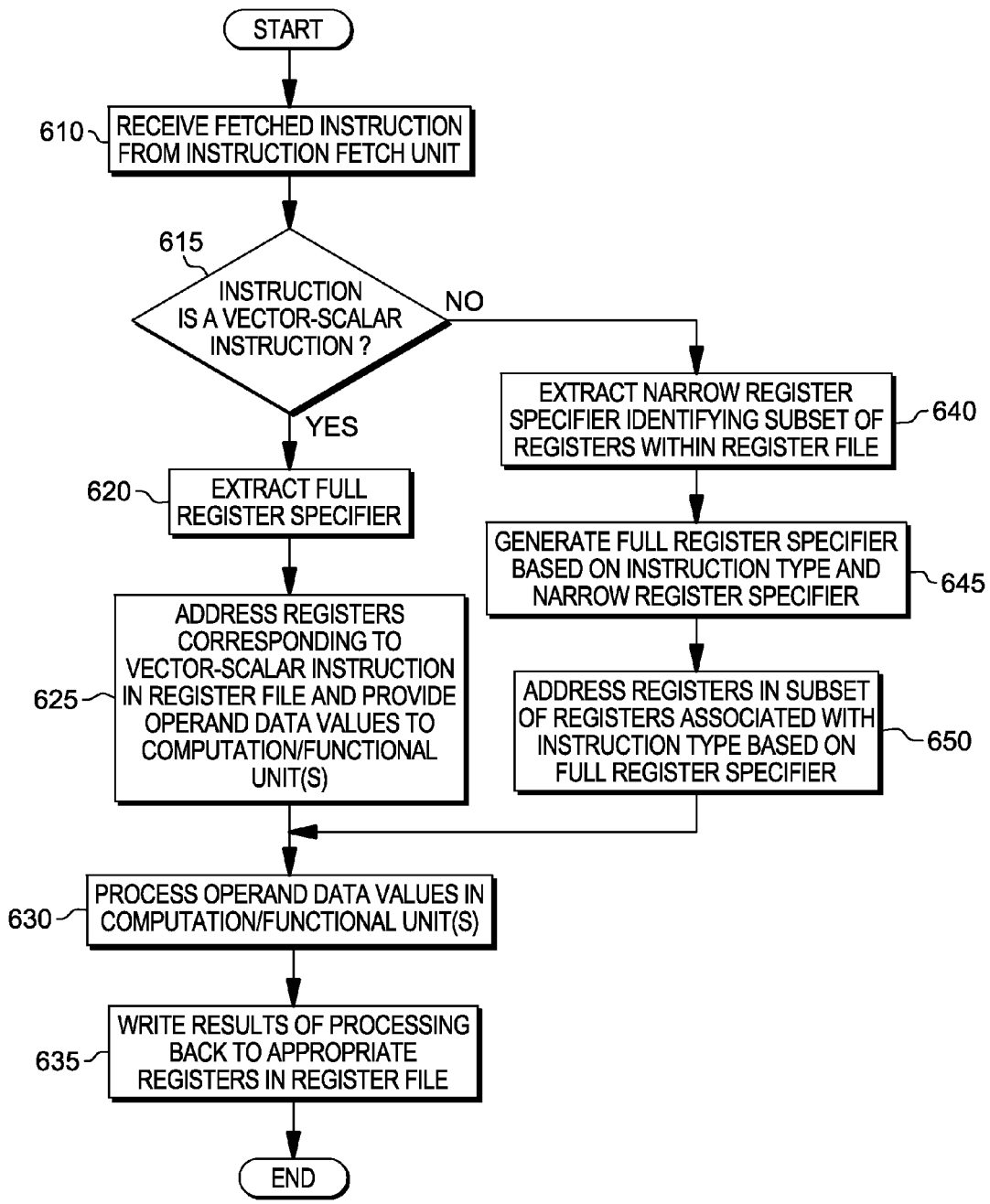
FIG. 6 depicts one example of logic outlining a general decode operation in accordance with one illustrative embodiment.
Figure 7A:
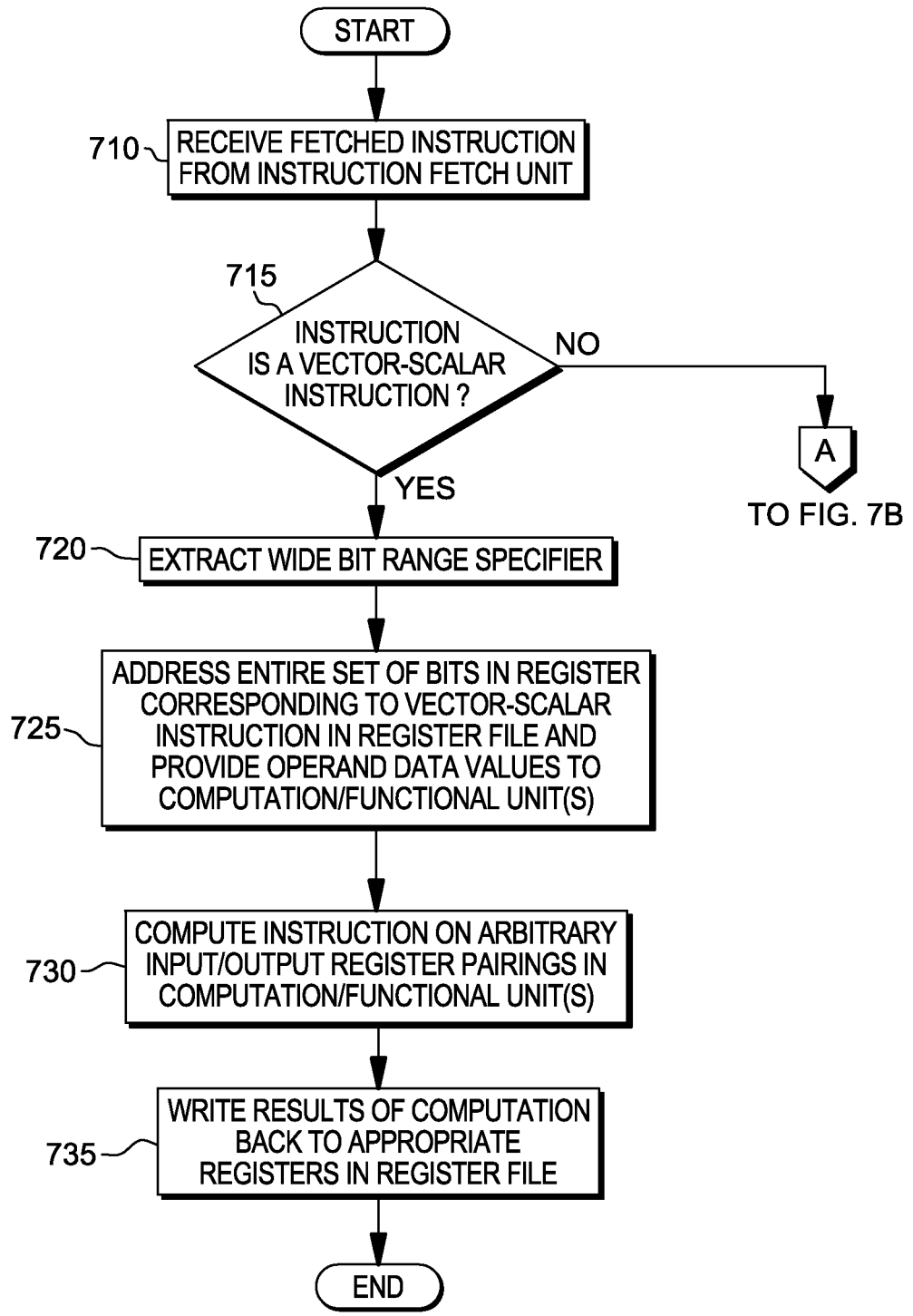
FIGS. 7A and 7B provide one example of logic outlining a decode operation in accordance with one illustrative embodiment.
Figure 7B:
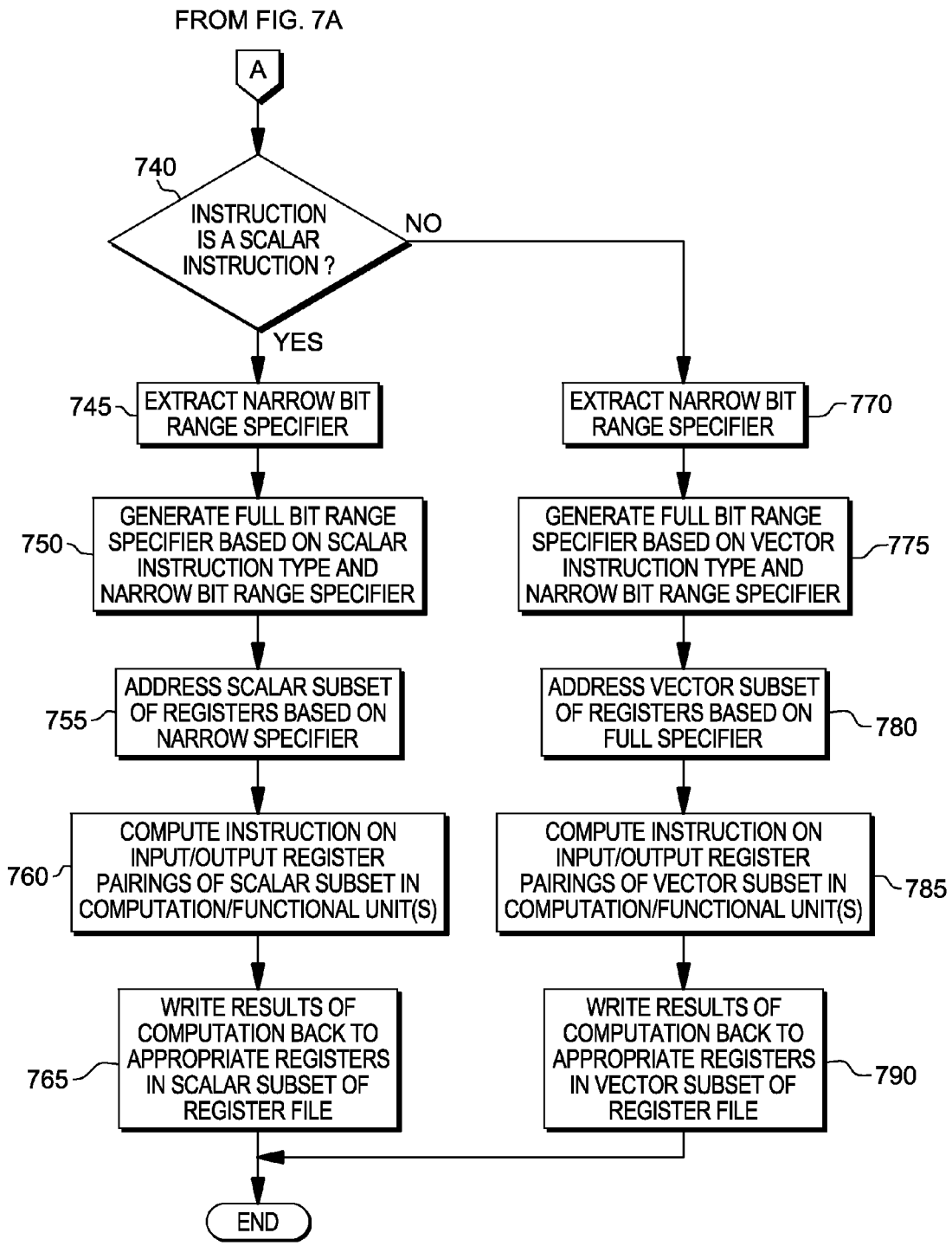

FIGS. 6-7B are flowcharts outlining example decoding operations that may be implemented in the decode logic of the instruction decode unit of one or more illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 6 is a flowchart outlining a general decode operation in accordance with one illustrative embodiment. As shown in FIG. 6, the operation starts with receiving a fetched instruction from an instruction fetch unit, STEP 610. Based on an opcode of the fetched instruction, the decode logic determines if the fetched instruction is a VSX instruction, STEP 615. If the opcode identifies the instruction to be a VSX instruction (or other selected type of instruction), a full register specifier is extracted from one or more fields in the instruction encoding, STEP 620. Instructions are specified by instruction words having several fields. These fields may include an opcode field, several register specifier fields, and a secondary opcode field, for example. When an instruction is encountered, the instruction decoder may determine what type of instruction is encountered (this is done by analyzing the opcode and secondary opcode field) which will also typically indicate what bits of a register to use (e.g., the subrange 520, 540, 560 to use.) The register specifier fields specify which register of 530, 550, or 570 to access. In one embodiment, each of the register specifier fields may provide a 5 bit specifier, i.e. a narrow specifier. Extension fields may be provided in the instruction word to provide an additional bit giving 6 bits to specify one of the 64 VSR registers of the register file.

Corresponding registers in the register file are addressed, i.e. selected, so as to provide their data values to appropriate computation or functional units for processing, STEP 625. That is, the full register specifier is provided to the register file, such that the register file knows which of the registers 570 to read or write. The register specifier is an "address" in a storage array that identifies a register.

The operand data values are processed by the computation/functional units, STEP 630, and results of the processing by the computation or functional units are then written back to the corresponding registers in the register file, STEP 635. The specific register to write back to is again specified by a register specifier.

If the opcode of the fetched instruction indicates that the instruction is not a VSX instruction (or other type of instruction), STEP 615, then a narrow register specifier is extracted that identifies a subset of registers, and possibly bits within the full width of a register, for use with the instruction, STEP 640. A full register specifier for the entire range of bits of the register is then generated based on the instruction type and the narrow bit range specifier, STEP 645. That is, one or more bits are added to the narrow register specifier to generate the full register specifier. The bits to be added depend on the subranges of the register file and how they were defined. For example, for legacy scalar instructions a 5-bit operand specifier, i.e. a narrow bit range specifier, is provided for each operand in the instruction encoding. A full register specifier may be generated, for example, by pre-pending a 0 to produce a 6-bit specifier, giving access to VSRs 0-31 in the depicted examples. For legacy vector instructions, a 5-bit operand specifier, i.e. a narrow register specifier, is provided for each operand in the instruction encoding. A full register specifier may be generated, for example, by pre-pending a 1 to produce a 6-bit specifier, giving access to VSRs 32-63. For VSX instructions, a 6-bit operand specifier, i.e. a full bit range specifier, is provided for each operand in the instruction encoding, and thus, no modification is needed to access all of the VSRs in the register file.

The narrow and full register specifiers of one or more of the illustrative embodiments allow for the "multi-addressable" nature of the register file which refers to the fact that different instructions in effect contain different addresses, and that the decoding adapts them, to overlay and use shared addressing of the register file. Thus, for example, a VSX register full register specifier with the 6 bits 000000 refers to VSX register 0. A legacy floating point instruction with a narrow register specifier of 5 bits 00000 refers to the same register, because it overlays the first 32 registers of VSR registers and is obtained by adding a "0" to the 5 bit narrow register specifier, giving 000000 in this specific example. On the other hand, a legacy VMX narrow register specifier of 5 bits 00000 refers to register 32 (the first register in the VSR 32 to 63 range), and is obtained by adding a "1" to the 5 bit specifier, giving 100000 in the specific example.

Once the full register specifier is obtained, registers in a subset of registers associated with the instruction type identified by the opcode are addressed based on the full register specifier, STEP 650. A bit width may optionally be determined based on the instruction type such that a first set of bits of the register are associated with one instruction type, e.g., legacy scalar instructions, and another set of bits of the register are associated with another instruction type, e.g., legacy vector instructions. This functionality was described above and is optional to the particular implementation. Because it is optional, it is not explicitly shown in FIG. 6.

The operation then continues to STEP 630 where data values, e.g., operand values, from the addressed registers are provided to the computation/functional units for processing, STEP 630, and results are written back to the registers in the subset of registers, STEP 635, using the full register specifier. The operation then terminates.

FIGS. 7A and 7B depict a flowchart outlining one example of a decode operation for one implementation in accordance with one illustrative embodiment. As shown in FIGS. 7A and 7B, the operation again starts with receiving a fetched instruction from an instruction fetch unit, STEP 710. Based on an opcode of the fetched instruction, the decode logic determines if the fetched instruction is a VSX instruction (or other selected type of instruction), INQUIRY 715. If the opcode identifies the instruction to be a VSX instruction, a wide bit range specifier is extracted, STEP 720. A wide bit range specifier can address any of the registers 570, i.e., the full register file is addressed, as well as all bits in those registers, STEP 725. The corresponding register may be any register in the entire register file. The instruction is then computed using the data from the register with the computation being on arbitrary input and output register pairings, STEP 730. In other words, the VSX instructions operate on any of the registers in the register file and are not limited to a particular sub-range of registers. The results of the computation are then written back to an appropriate register in the register file, STEP 735.

If the opcode of the instruction indicates that the instruction is not a VSX instruction, INQUIRY 715, then the decode logic determines if the instruction opcode identifies the instruction to be a scalar instruction, e.g., a floating point instruction or the like, INQUIRY 740 (FIG. 7B). If the instruction opcode identifies the instruction as a scalar instruction, then a narrow bit range specifier is extracted that identifies a subset of registers within the register file, and optionally, a subset of bits within the registers of the subset of registers, STEP 745. A full bit range specifier is generated based on the instruction type and the narrow bit range specifier, STEP 750. Data is extracted from a subset of registers, e.g., the scalar subset of registers, associated with the instruction type specified by the opcode using the narrow bit range specifier, STEP 755. The data is provided to the computation/functional units which compute results based on input and output registers corresponding to the scalar subset of registers in the register file, STEP 760. The results of the computation are then written back to an appropriate register in the subset of registers for this instruction type, e.g., scalar register subset, STEP 765.

If the opcode of the instruction indicates that the instruction is not a scalar instruction, INQUIRY 715, then a narrow bit range specifier is extracted that again identifies a subset of registers in the register file and optionally another subset of bits within these registers, STEP 770. A full bit range specifier is generated based on the instruction type, e.g., vector, SIMD, or VMX instruction, and the narrow bit range specifier, STEP 775. Data is extracted from a subset of registers, e.g., the vector subset of registers, associated with the instruction type specified by the opcode using the full bit range specifier, STEP 780. The data is provided to the computation/functional units which compute results based on input and output registers corresponding to the vector subset of registers in the register file, STEP 785. The results of the computation are then written back to an appropriate register in the subset of registers for this instruction type, e.g., vector register subset, STEP 790. The operation then terminates.

It can be seen from the above description that one or more illustrative embodiments provide a register file and decode methodology that permits a plurality of different types of addressing modes. For example, in a first addressing mode, a non-contiguous encoding is used to select all operand registers from a full set of registers in the register file based on a first instruction type, e.g., VSX instruction type. In a second addressing mode, a contiguous encoding is used and a first range of addressable operand registers of the full set of registers in the register file is selected based on a second instruction type, e.g., a scalar instruction type. A register address is constructed for each of the operands such that all of the operands for the instruction are obtained from the first range of addressable operand registers.

In a third addressing mode, a contiguous encoding is also used and a second range of addressable operand registers is selected from the full set of registers in the register file based on a third instruction type, e.g., a vector instruction type. A register address is constructed for each of the operands such that the operands for the instruction are obtained from the second range of addressable operand registers. This second range of operand registers is, in one example, different from the first range of operand registers such that a register within the first range is not within the second range of operand registers.

One or more illustrative embodiments improve upon known systems and processor register file architectures and instruction decode methodologies by allowing a single register file to be used in processing legacy scalar, legacy vector, and vector-scalar instructions. In this way, legacy scalar and vector instructions may be processed in addition to vector-scalar instructions with data formats being compatible between the various instruction types. Moreover, since a single register file is being utilized, the overhead associated with switching between separate register files is avoided. Register sharing in accordance with one or more illustrative embodiments reduces the chip area of a register file and allows a unified register file to be utilized while maintaining legacy code without building separate legacy register files. One or more illustrative embodiments allow for data sharing between legacy and new/enhanced instructions, i.e., a legacy instruction may write one of registers 530 or 550, and a VSX instruction can combine values from any or all of registers 570.

Figure 8:
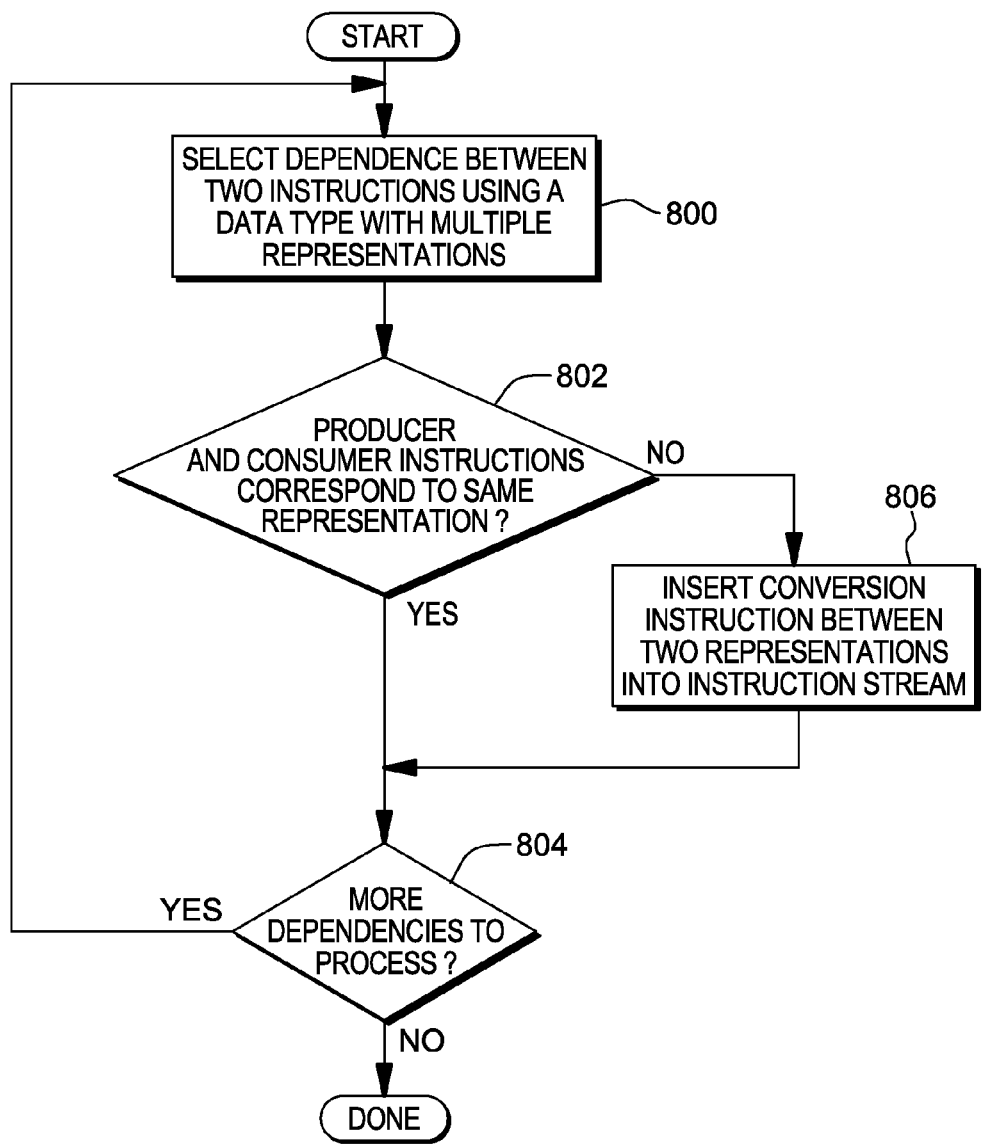
FIG. 8 depicts one example of logic used to insert a conversion instruction into an instruction stream, in accordance with an illustrative embodiment.

In a further aspect of the present invention, a capability is provided for translating between different representations. As an example, when a producer instruction is of one format and produces a result to be consumed by a consumer instruction of a different format, a conversion takes place. In one particular aspect, a compiler executing on a processor determines the mismatch and inserts an appropriate conversion instruction between the producer and consumer instructions, as described with reference to FIG. 8. As one example, FIG. 8 depicts on embodiment of the logic to determine that conversion is necessary or desired, and to select and insert a conversion instruction. In one example, it is the compiler performing this logic. However, in other embodiments, it can be other components or entities of or executing on the processor.

Referring to FIG. 8, initially a dependence is selected between two instructions using a data type with multiple representations, STEP 800. That is, two instructions that are dependent on one another (e.g., one is to use a value or result provided by another) are selected for processing. A determination is made as to whether the selected instructions (e.g., the producer and consumer instructions) correspond to a same representation, INQUIRY 802. If both instructions have the same or compatible representation, then a further determination is made as to whether there are more dependencies to process, INQUIRY 804. If so, processing continues with STEP 800.

Returning to INQUIRY 802, if the producer and consumer instructions do not correspond to the same or a compatible representation, then a conversion instruction is inserted between the two instructions in the instruction stream, STEP 806. The conversion instruction is used to convert the data of one of the instructions (e.g., the producer instruction) to a format compatible with the other instruction (e.g., the consumer instruction). In one example, the data to be converted is in one register of the multi-addressable register file (identified in the conversion instruction) and the converted data is placed in another register (or the same register) of the multi-addressable register file (also indicated in the conversion instruction). The instruction to use the data obtains the converted data from that register. In one example, the compiler determines the registers to be used by the conversion instruction based on the producer and consumer instructions. The producer instruction indicates the register that has the data to be translated or converted, and the consumer instruction provides an indication of the register it will use to retrieve the data. Processing continues with INQUIRY 804.

Figure 9:
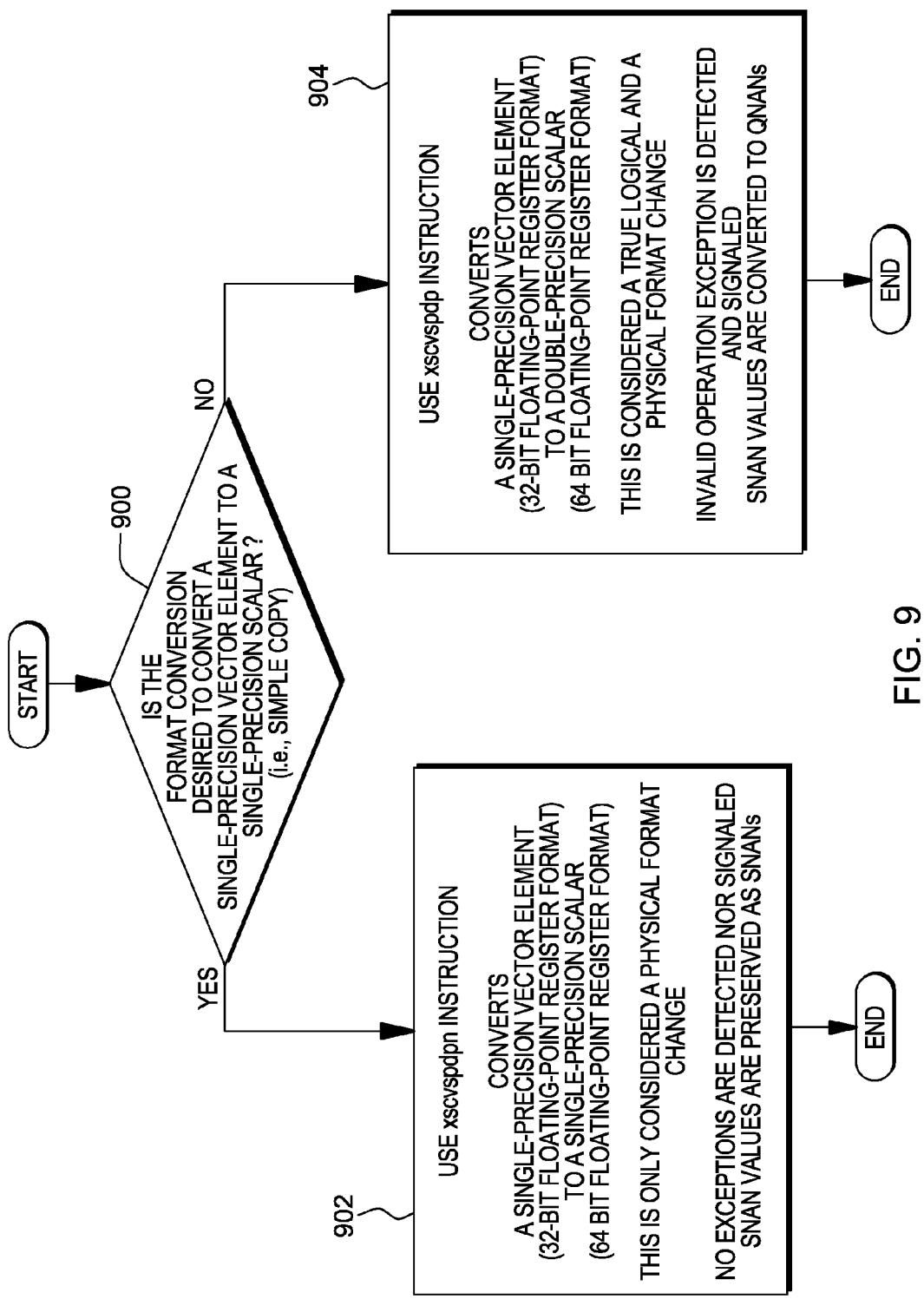
FIG. 9 depicts one example of logic used to select a conversion instruction to be used to convert a vector element to scalar, in accordance with an illustrative embodiment.

In one embodiment, the conversion instruction that is inserted depends on one or more criteria, as described in further detail with reference to FIGS. 9 and 10. FIG. 9 relates to vector to scalar conversion, and FIG. 10 relates to scalar to vector conversion. One of these techniques is selected depending on the type of conversion (e.g., vector-scalar or scalar-vector). This logic, including the logic of FIGS. 9 and 10, are performed by the compiler, in one example.

Referring initially to FIG. 9, a determination is made as to whether the format conversion desired is to convert a single-precision vector element to a single-precision scalar, INQUIRY 900. If the desired format conversion is a simple copy in which the conversion is from a single precision vector element to single-precision scalar, then a convert instruction, referred to herein as XSCVSPDPN, is used, STEP 902. This instruction converts a single precision vector element (32-bit floating-point register format) to single precision scalar (64-bit floating-point register format). This conversion is only considered a physical format change and not a logical change, and therefore, no exceptions are detected or signaled, and signaling Not-a-Number (SNaN) inputs are preserved as SNaNs in the result returned. That is, the conversion is performed transparent to any entity or component outside the compiler. Since no exception is raised (i.e., detected and/or signaled), the conversion is said to be performed independent of an exception (i.e., absent or without an exception).

Returning to INQUIRY 900, however, if the desired format conversion is not to convert a single precision vector element to a single precision scalar element, then a different instruction, referred to herein as an XSCVSPDP instruction, is used in this embodiment, STEP 904. This instruction converts a single-precision vector element (32-bit floating-point register format) to a double-precision scalar (64-bit floating-point register format). This is considered a true logical and a physical format change, and therefore, an invalid operation exception is detected and signaled as a Signaling NAN (Not-a-Number). SNaN values are converted to QNaNs (quiet NaN) in the result returned.

Figure 10:
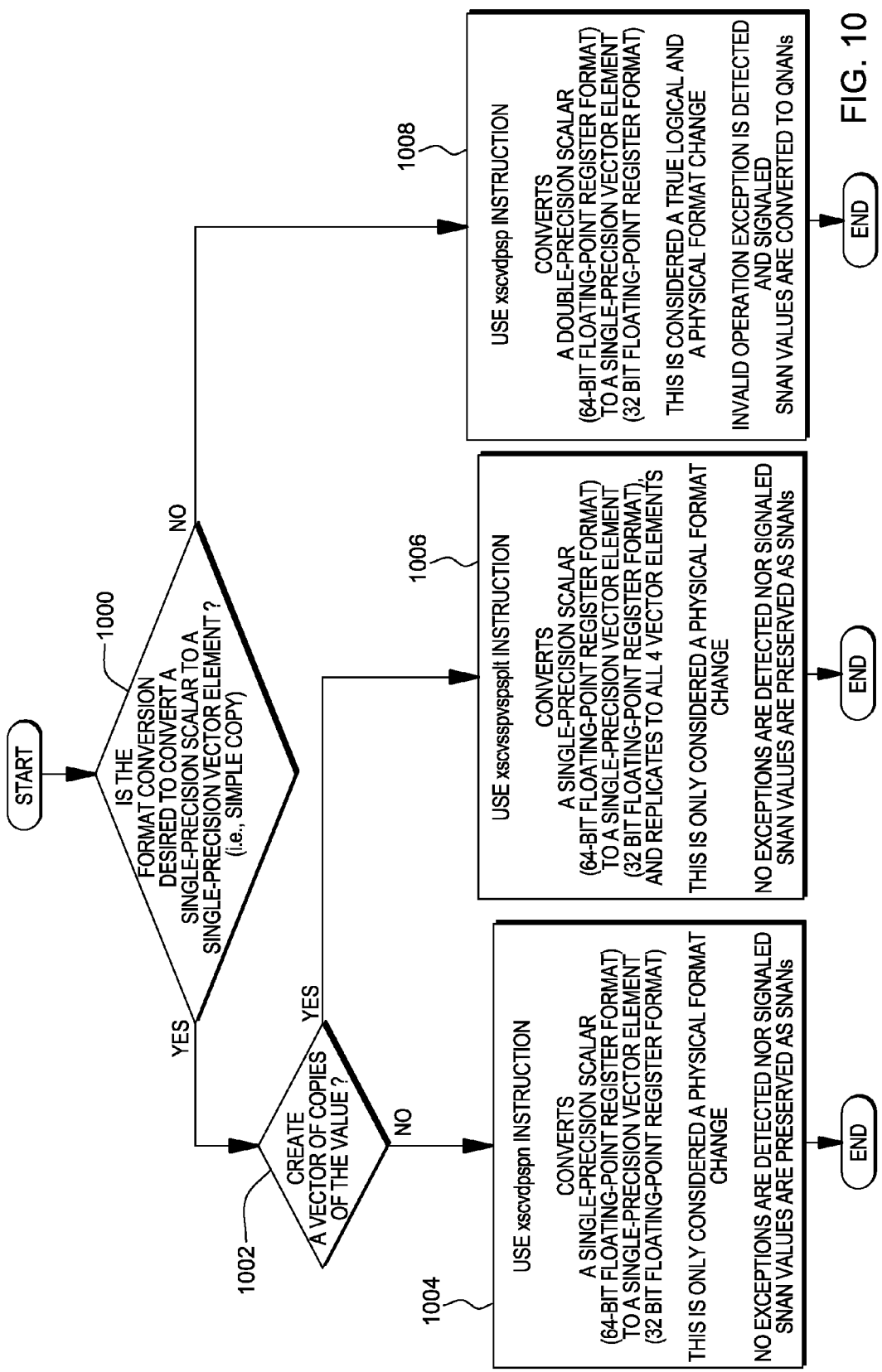
FIG. 10 depicts one example of logic used to select a conversion instruction to be used to convert scalar data to a vector element in accordance with an illustrative embodiment.

Referring to FIG. 10, in a further embodiment, a decision is made as to whether the format conversion that is desired is to convert a single-precision scalar datum to a single-precision vector element, INQUIRY 1000. If the desired conversion is a simple copy and a single-precision scalar is to be converted to a single-precision vector element, then a further determination is made as to whether a vector of copies of the value is to be created, INQUIRY 1002. If a vector of copies of the value is not to be created, then an instruction referred to herein as XSCVDPSPN is used, which converts a single-prevision scalar (64-bit floating-point register format) to a single-precision vector element (32-bit floating-point register format). STEP 1004. This is only considered a physical format change and not a logical change, and therefore, no exceptions are detected or signaled and SNaN values are preserved as SNaNs in the result returned. Again, the conversion is transparent and performed independent of exceptions. Returning to INQUIRY 1002, however, if a vector of copies of the value is to be created, INQUIRY 1002, then an instruction referred to herein as XSCVSSPVSPSPLT is used, STEP 1006. This converts a single precision scalar (64-bit floating-point register format) to a single-precision vector element (32-bit floating-point register format), and replicates to all four vector elements. Again, this is only considered a physical format change, no exceptions are detected or signaled, and SNaN inputs are preserved as SNaNs in the result returned.

Returning to INQUIRY 1000, if the format conversion desired is not a conversion of a single-precision scalar to a single-precision vector element, then an instruction referred to herein as XSCVDPSP is used, STEP 1008. This instruction converts a double-precision scalar (64-bit floating-point register format) to a single-precision vector element (32-bit floating-point register format). In this case, the conversion is considered a true logical as well as physical format change, and therefore, an invalid operation exception is detected and signaled as a Signaling Not-a-Number operand. SNaN values are converted to QNaNs in the result returned.

Described above are a number of conversion instructions that may be used in one or more embodiments. Further details regarding these instructions are described below, as well as in "RFC02242.r3: BFPNSX Miscellaneous Operations", which is included as part of the publication of the as-filed instant application, published on Mar. 21, 2013 as U.S. Patent Pub. No. 2013/0073838 A1, which is hereby incorporated herein by reference in its entirety.

Initially, further details are provided regarding the XSCVSPDPN instruction. In one example, this instruction includes two fields identifying an opcode (e.g., one field having a primary opcode which is combined (e.g., concatenated) with an extended opcode of another field) to identify the instruction; a first field (e.g., T field) and a first bit (e.g., TX field; concatenated) designating a first register; and a second field (e.g., B field) and a second bit (e.g., BX field; concatenated) designating a second register. Sample pseudo-code is as follows:

```
reset_xflags( )
src ← VSR[32×BX+B].word[0]
result ← ConvertSPtoDP_NS(src)
VSR[32×TX+T].dword[0] ← result
VSR[32×TX+T].dword[1] ← 0xUUUU_UUUU_UUUU_UUUU
```

Let XT be the value TX concatenated with T.
Let XB be the value BX concatenated with B.
Let src be the single-precision floating-point value in word element 0 of VSR[XB].
src is placed into doubleword element 0 of VSR[XT] in double-precision format. The encoding of SNaN values are preserved (i.e., not converted to a QNaN).
The contents of doubleword element 1 of VSR[XT] are undefined.
Special Registers Altered
None src = VSR[XB]

| SP | unused | unused | unused |
|---|---|---|---| tgt = VSR[XT]

| DP | undefined |
|---|---|
| 0        32        64 | 96        127 |

Further, code snippet examples for converting a 32-bit single-precision vector element to 64-bit single-precision scalar are provided below:

```
C source
void compute1( )
{
    float sa, sb, sx;
    vector float vx, vy, vz;
    :
    vz = vec_mergeh(vx,vy);     // will not set VXSNAN exception
    sa = vz[1];                  // vector-to-scalar simple copy, do not
                                 //   set VXSNAN exception
    sb = vz[3];                  // vector-to-scalar simple copy, do not
                                 //   set VXSNAN exception
    sx = compute2(sa,sb);
}
float compute2(float sa, float sb)
{
    return sa + sb;              // where VXSNAN should be detected
}
Equivalent assembler
compute1:
    :              :
    lxvx      vx,addr_vx
    lxvx      vx,addr_vy
    :              :
    vmrghwvz,vx,vy
    vsldoi    vtmp1,vz,vz,4      ; extract SP vector element 1 of vz
    xscvspdpn sa,vtmp1           ; convert SP vector 32-bit format to
                                 ;   scalar 64-bit format, do not set
                                 ;   VXSAN, simple copy
    vsldoi    vtmp2,vx,vx,12     ; extract vector element 3 of vz
    xscvspdpn sa,vtmp2           ; convert SP vector 32-bit format to
                                 ;   scalar 64-bit format, do not set
                                 ;   VXSNAN, simple copy
    bcl       compute2
    :              :
compute2:
    :              :
```

```
xsaddsp    sx,sa,sb              # VXSNAN should be detected here
:
blr
```

Further, details regarding the XSCVSPDP instruction are described below. In one example, this instruction includes two fields identifying an opcode (e.g., one field having a primary opcode which is combined (e.g., concatenated) with an extended opcode of another field) to identify the instruction; a first field and a first bit (e.g., concatenated) designating a first register; and a second field and a second bit (e.g., concatenated) designating a second register. Sample pseudo-code is as follows:

```
reset_xflags( )
src ← VSR[32×BX+B].word[0]
result ← ConvertVectorSPtoScalarSP(src)
if(vxsnan_flag) then SetFX(VXSNAN)
vex_flag ← VE & vxsnan_flag
FR ← 0b0
FI ← 0b0
if( ~vex_flag ) then do
    VSR[32×TX+T].dword[0] ← result
    VSR[32×TX+T].dword[1] ← 0xUUUU_UUUU_UUUU_UUUU
    FPRF ← ClassDP(result)
end
```

Let XT be the value TX concatenated with T.
Let XB be the value BX concatenated with B.
Let src be the single-precision floating-point value in word element 0 of VSR[XB].
If src is a SNaN, the result is src, converted to a QNaN (i.e., bit 9 of src set to 1). VXSNAN is set to 1.
Otherwise, the result is src.
The result is placed into doubleword element 0 of VSR [XT] in double-precision format.
The contents of doubleword element 1 of VSR[XT] are undefined.
FPRF is set to the class and sign of the result. FR is set to 0. FI is set to 0.
If a trap-enabled invalid operation exception occurs, VSR [XT] is not modified, FPRF is not modified, FR is set to 0, and FI is set to 0.
Special Registers Altered
FPRF FR←0b0 FI←0b0 FX VXSNAN
VSR Data Layout for XSCVSPDP src = VSR[XB]

| SP | unused | unused | unused |
|---|---|---|---| tg = VSR[XT]

| DP | undefined |
|---|---|
| 0        32        64 | 96        127 |

Yet further, details regarding the XSCVDPSPN instruction are described below. In one example, this instruction includes two fields identifying an opcode (e.g., one field having a primary opcode which is combined (e.g., concatenated) with an extended opcode of another field) to identify the instruction; a first field and a first bit (e.g., concatenated) designating a first register; and a second field and a second bit (e.g., concatenated) designating a second register. Sample pseudo-code is as follows:

```
reset_xflags( )
src ← VSR[32×BX+B].dword[0]
result ← ConvertDPtoSP_NS(src)
VSR[32×TX+T].word[0] ← result
VSR[32×TX+T].word[1] ← 0xUUUU_UUUU
VSR[32×TX+T].word[2] ← 0xUUUU_UUUU
VSR[32×TX+T].word[3] ← 0XUUUU_UUUU
```

Let XT be the value TX concatenated with T.

Let XB be the value BX concatenated with B.

Let src be the single-precision floating-point value in doubleword element 0 of VSR[XB] represented in double-precision format.

src is placed into word element 0 of VSR[XT] in single precision format. The encoding of SNaN values are preserved (i.e., not converted to a QNaN).

The contents of word elements 1, 2, and 3 of VSR[XT] are undefined.

Special Registers Altered

None

VSR Data Layout for xscvdpspn

```
src = VSR[XB]
| SP | unused | tgt = VSR[XT]
| SP | undefined | undefined | undefined |
0    32          64          96          127
```

Further, details regarding the XSCVSSPVSPSPLT instruction are described below. In one example, this instruction includes two fields identifying an opcode (e.g., one field having a primary opcode which is combined (e.g., concatenated) with an extended opcode of another field) to identify the instruction; a first field (e.g.; T. field) and a first bit (e.g., TX bit; concatenated) designating a first register; and a second field (e.g., B field) and a second bit (e.g., BX bit; concatenated) designating a second register. Sample pseudo-code is as follows:

```
reset_xflags( )
src ← VSR[32×BX+B].dword[0]
result ← ConvertDPtoSP_NS(src)
do i = 0 to 3
    VSR[32×TX+T].word[i] ← result
end
```

Let XT be the value TX concatenated with T.

Let XB be the value BX concatenated with B.

Let SRC be the single-precision floating-point value in doubleword element 0 of VSR[XB] represented in double-precision format. The encoding of SNaN values are preserved (i.e., not converted to a QNaN).

src is placed into each word element of VSR[XT] in single-revision format.

Special Registers Altered

None

VSR Data Layout for xscvsspvspsplt

```
src = VSR[XB]
| SP | unused | tgt = VSR[XT]
| SP | SP | SP | SP |
0    32   64   96   127
```

Additionally, code snippet examples for converting a 64-bit single-precision scalar to a 32-bit single-precision vector element with replication (splat) are described below:

```
C Source
void compute( )
{
    :
    float sa;
    vector float vx;
    :
    vx = vec_splatw(sa,0);        // create vector of 4 copies of SA
}
Equivalent assembler
compute:
    :
    lxsspx      sa,addr_sa
    xscvdpspn   sa,sa
    vspltw      vx,sa,0
    :
    blr
```

Further, details regarding XSCVDPSP are provided below. In one example, this instruction includes two fields identifying an opcode (e.g., one field having a primary opcode which is combined (e.g., concatenated) with an extended opcode of another field to identify the instruction; a first field (e.g., T field) and a first bit (e.g., TX bit; concatenated) designating a first register; and a second field (e.g., B field) and a second bit (e.g., BX bit; concatenated) designating a second register. Sample pseudo-code is as follows:

```
reset_xflags( )
src ← VSR[32×BX+B].dword[0]
result ← ConvertDPtoSP(src)
if(vxsnan_flag) then SetFX(VXSNAN)
if(xx_flag) then SetFX(XX)
if(ox_flag) then SetFX(OX)
if(ux_flag) then SetFX(UX)
vex_flag ← VE & vxsnan_flag
if( ~vex_flag ) then do
    VSR[32×TX+T].word[0] ← result
    VSR[32×TX+T].word[1] ← 0xUUUU_UUUU
    VSR[32×TX+T].word[2] ← 0xUUUU_UUUU
    VSR[32×TX+T].word[3] ← 0xUUUU_UUUU
    FPRF ← ClassSP(result)
    FR ← inc_flag
    FI ← xx_flag
end
else do
    FR ← 0b0
    FI ← 0b0
end
```

Let XT be the value TX concatenated with T.

Let XB be the value BX concatenated with B.

Let src be the double-precision floating-point value in doubleword element 0 of VSR[XB].

If src is a SNaN, the result is src converted to a QNaN (i.e., bit 12 of src is set to 1). VXSNAN is set to 1.

Otherwise, if src is a QNaN, an Infinity, or a Zero, the result is src.

Otherwise, the result is src rounded to single-precision using the rounding mode specified by RN.

The result is placed into word element 0 of VSR[XT] in single-precision format.

The contents of word elements 1, 2, and 3 of VSR[XT] are undefined.

FPRF is set to the class and sign of the result. FR is set to indicate if the result was incremented when rounded. FI is set to indicate the result is inexact.

If a trap-enabled Invalid Operation exception occurs, VSR[XT] and FPRF are not modified, and FR and FI are set to 0.

Special Registers Altered
FPRF FR FI FX OX UX XX VXSNAN
VSR Data Layout for xscvdpsp

```
src = VSR[XB]
```
| DP | unused |
|---|---| tgt -VSR[XT]
| SP | undefined | undefined | undefined |
|---|---|---|---|
| 0 | 32 | 64 | 96    127 |

Described in detail herein is an extended VSX facility with support for instructions computing on scalar single precision numbers using a 64-bit representation and instructions computing on vector single precision numbers using a 32-bit representation. There is further provided a capability to translate from a first to a second representation. In a first embodiment, explicit conversion from 64 to 32-bit and 32-bit to 64 bit operations are used. In a second embodiment, instructions are used to convert between single precision representations by using double precision/single precision conversions to convert between 32 bit and 64 bit representations of single precision numbers, in which the 64-bit representation of a single precision number is of a similar form as the double precision operation. In a further embodiment, the conversion operation also provides a splat function, in which a 32-bit single precision value is replicated to a plurality of element positions. In one embodiment, the conversion operation also provides a selection function in which a 32-bit single precision value is selected from a plurality of element positions by means of a position indicator.

In accordance with one or more aspects, multiple architected representations are used. A capability is provided to include and identify 64-bit single precision numbers in a first mode of operation; and 32-bit single precision numbers in a second mode of operation. A capability is provided to identify a first and second operation based on the type of operation needed to compatibly interoperate with the first and second legacy encoding representing first and second encodings. A technique to translate between the first and second representation is provided.

By converting between one representation and another, execution complexity may be reduced by eliminating the need to perform checking of boundary conditions. Further, by inserting a conversion instruction to convert one data representation to another, the number of instructions to be encoded, the decode logic and implementation costs are reduced.

In accordance with one or more aspects, the mixing of 32-bit single precision representation used for vector computing and 64-bit representation of single precision floating point using scalar computing is enabled. New single precision-to-single precision format conversion instructions are provided to convert from one 64-bit format to another 32-bit format or vice-versa. Also, a conversion instruction converting a 64-bit single precision to a 32-bit single precision and replicate is provided in which the same value is replicated in the register four times, which is a common operation for a vector-scalar computation. Conversion is performed without regard to signaling characteristics, because a conversion of this type is not a computation instruction.

Additionally, a compiler technique is provided to facilitate computation using two different floating point representations for the same 32-bit single precision floating point data type. The compiler is extended to recognize that when data is used it may be either in one or another representation and a check is to be performed to ensure that the data used is in the appropriate format used by an instruction. This is accomplished by associating each instruction with a data type, and the data type of the instruction generating a result is to be the same as the data type of the instruction using the result. If that is not the case, a conversion is inserted. The format conversions are performed directly from register-to-register without setting an exception.

In one aspect, floating point registers are used that can contain two different representations of each floating point number. Instructions specify which type of floating point number is to be used for operands of the instruction and obtain/store the operand from a selected one of the representations if present. Also, a compiler knows of the floating point registers and inserts conversion instructions as needed when the floating point register contains the wrong representation.

In one particular example, an instruction is provided that converts from a first architected format (e.g., the SP64 64-bit wide single precision binary floating point format in accordance with the definition of the Power ISA) in a register of a register class (which can be a multi-addressable register file) to a second architected format (e.g., the SP32 32-bit wide single precision binary floating point format in accordance with the IEEE 754 memory format definition and a similar Power ISA definition) for a register file format.

The SP64 to SP32 conversion is used, for instance, to accommodate the maintenance of different internal formats by the compiler in accordance with the architecture definition where each number has, e.g., an exact correspondence (the SP64 to SP32 format conversion). This is different from a DP (Double Precision) to SP conversion, which is a user-defined operation.

For example, the DP to SP conversion needs to map DP numbers to SP numbers, even for DP numbers that have no representation in the SP format. It may do this by performing rounding of excess mantissa bits (in accordance with one of many possible rounding modes, such as truncate, round to 0, round to −infinity, round to +infinity, round away from zero, round to even, round to odd, and many more), flush to zero of small numbers that are representable in DP but not in SP, and saturating large numbers that are representable in DP but not in SP to +infinity or −infinity. In comparison, the SP64 to SP32 convert operates, in one example, exclusively on SP numbers, so in at least one embodiment, the operation of SP64 to SP32 convert is undefined when an input is not in representable IEEE SP floating point range. Compliant hardware may do whatever it chooses, in accordance with an aspect of this embodiment; it may choose to treat an out of range (illegal) SP64 bit input as if it were a DP number, and round it; it may choose to raise a specification interrupt for out of range numbers; it may choose to generate a random result; or it may not generate a result at all.

As another example, a DP to SP conversion is a user-specified instruction for a data type conversion, and in accordance with the definition of this user-specified instruction, an SNaN (i.e., a Signaling NaN, where NaN is Not-a-Number indication in accordance with the IEEE standard) should raise an exception. Also, in one embodiment, this user-specified instruction may be defined to set exceptions on arithmetic conditions during number conversion (e.g., underflow or overflow). In comparison, the SP64 to SP32 is a format conversion corresponding to internal operation of a compiler exploiting the hardware. In one example, each valid data point in the SP64 bit format corresponds to exactly one data point in the SP32 format. When any such data point is provided as an input (and specifically including SNaNs), the data points are mapped from the one format representation to the second representation, and not raising an interrupt.

In one embodiment, a legal single precision number is directly converted from a first architected register format to a second register format, wherein the instruction is completed and the converted result is written to a target register for IEEE single precision floating point Number or Not-a-Number inputs. In one example, a signaling NaN is preserved in the target register as a signaling NaN.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 11:
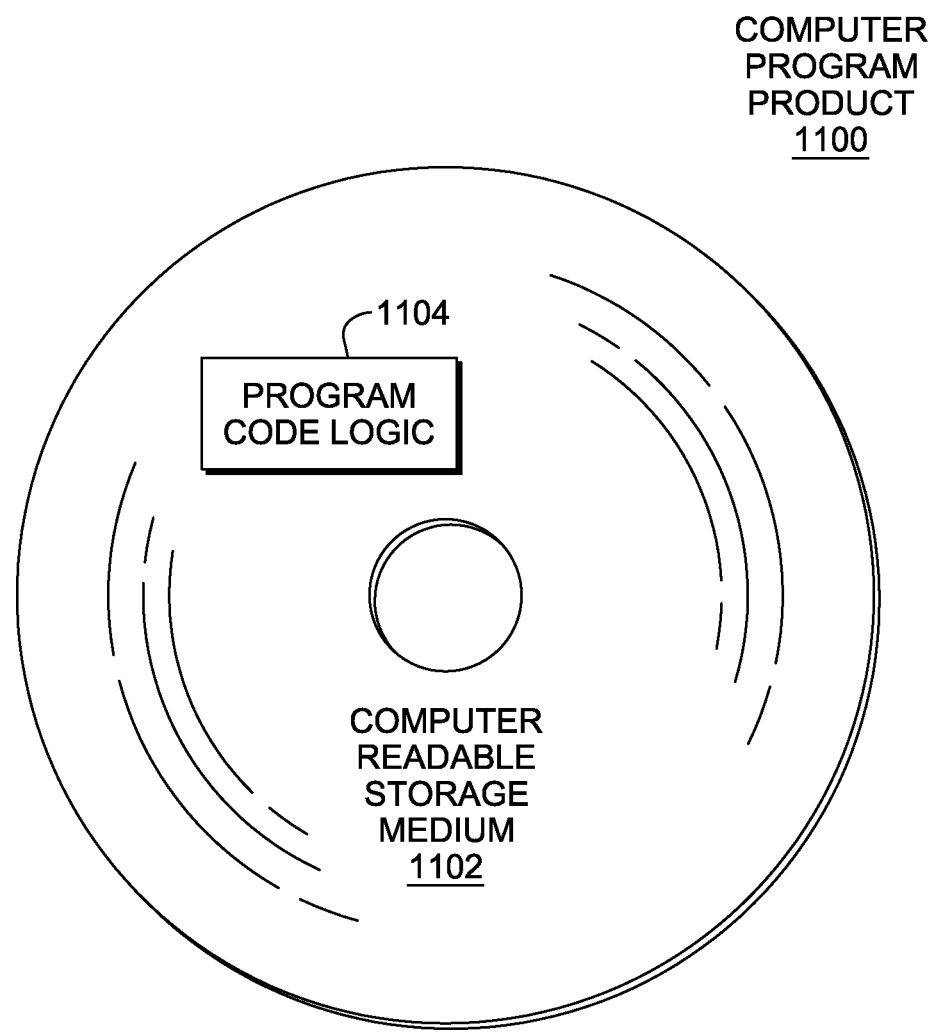
FIG. 11 depicts one embodiment of a computer program product incorporating one or more aspects of the present invention.

Referring now to FIG. 11, in one example, a computer program product 1100 includes, for instance, one or more non-transitory computer readable storage media 1102 to store computer readable program code means or logic 1104 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for one or more aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of one or more aspects of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Further, one or more aspects of the present invention apply to any format with multiple representations. As one specific example, one or more aspects can apply to a definition of quad-precision (128-bit) floating-point extension supporting both 64-bit double-precision format and a 128-bit double precision format. One or more aspects may apply to consolidating multiple extensions that support different format definitions for a data type. Further, other instructions may be used without departing from a spirit of the present invention.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

As a further example, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for executing a machine instruction, said computer program product comprising:
    a non-transitory computer readable storage medium readable by a processing circuit and storing instructions for execution by the processing circuit for performing a method comprising:
        obtaining, by a processor, a machine instruction for execution, the machine instruction being defined for computer execution according to a computer architecture, the machine instruction comprising:
            at least one field used to specify a first register;
            at least one other field used to specify a second register; and at least one opcode field including an operation code to identify a format conversion instruction, wherein the operation code explicitly specifies a format of information in the first register and a format of information to be placed in the second register; and executing, by the processor, the machine instruction, the executing comprising:

obtaining from the first register a single-precision binary floating point datum in a first representation in a first format;

converting the single-precision binary floating point datum of the first representation in the first format to a converted single-precision binary floating point datum of a second representation in a second format, wherein the first format is of a different size than the second format and wherein at least one of the first format or the second format is 64-bit; and placing the converted single-precision binary floating point datum in the second register, wherein the single-precision binary floating point datum obtained from the first register comprises a signaling Not-a-Number (SNaN) as defined by a standard for representing the floating point datum, and wherein the SNaN is preserved as a SNaN in the second register.

2. The computer program product of claim 1, wherein the method further comprises:

determining that the single-precision binary floating point datum of the first representation in the first format is to be converted to a single-precision binary floating point datum of the second representation in the second format; and obtaining the format conversion instruction, based on the determining.

3. The computer program product of claim 2, wherein the determining is performed by a compiler executing on the processor or on another processor.

4. The computer program product of claim 1, wherein at least one of the first register and the second register is a register of a multi-addressable register file.

5. The computer program product of claim 4, wherein the multi-addressable register file comprises a plurality of registers, and wherein a first subrange of bits of one or more registers of the plurality of registers is defined for data of a first format, a second subrange of bits of the one or more registers of the plurality of registers is defined for data of one or more second formats, and an entire range of bits of the one or more registers of the plurality of registers is defined for data of a third format.

6. The computer program product of claim 5, wherein each of the plurality of registers is defined to include 64-bit scalar single-precision floating point data and 32-bit vector single-precision floating point data.

7. The computer program product of claim 1, wherein the machine instruction is inserted between a first instruction and a second instruction, the second instruction having a dependence on the first instruction, and the first instruction to produce data having a different format than a format used by the second instruction.

8. The computer program product of claim 7, wherein the first register includes a datum of the first instruction to be converted.

9. The computer program product of claim 1, wherein (i) the first representation comprises a vector representation and the first format is 32-bit and the second representation comprises a scalar representation and the second format is 64-bit, or (ii) the first representation comprises a scalar representation and the first format is 64-bit and the second representation comprises a vector representation and the second format is 32-bit.

10. The computer program product of claim 1, wherein the format conversion instruction includes a replication function.

11. A computer system for executing a machine instruction, said computer system comprising:

a memory; and a processor in communications with the memory, wherein the computer system is configured to perform a method, said method comprising:

obtaining, by the processor, a machine instruction for execution, the machine instruction being defined for computer execution according to a computer architecture, the machine instruction comprising:

at least one field used to specify a first register;

at least one other field used to specify a second register; and at least one opcode field including an operation code to identify a format conversion instruction, wherein the operation code explicitly specifies a format of information in the first register and a format of information to be placed in the second register; and executing, by the processor, the machine instruction, the executing comprising:

obtaining from the first register a single-precision binary floating point datum in a first representation in a first format;

converting the single-precision binary floating point datum of the first representation in the first format to a converted single-precision binary floating point datum of a second representation in a second format, wherein the first format is of a different size than the second format and wherein at least one of the first format or the second format is 64-bit; and placing the converted single-precision binary floating point datum in the second register, wherein the single-precision binary floating point datum obtained from the first register comprises a signaling Not-a-Number (SNaN) as defined by a standard for representing the floating point datum, and wherein the SNaN is preserved as a SNaN in the second register.

12. The computer system of claim 11, wherein the method further comprises:

determining that the single-precision binary floating point datum of the first representation in the first format is to be converted to a single-precision binary floating point datum of the second representation in the second format; and obtaining the format conversion instruction, based on the determining.

13. The computer system of claim 11, wherein at least one of the first register and the second register is a register of a multi-addressable register file, and wherein the multi-addressable register file comprises a plurality of registers, and wherein a first subrange of bits of one or more registers of the plurality of registers is defined for data of a first format, a second subrange of bits of the one or more registers of the plurality of registers is defined for data of one or more second formats, and an entire range of bits of the one or more registers of the plurality of registers is defined for data of a third format.

14. The computer system of claim 13, wherein each of the plurality of registers is defined to include 64-bit scalar single-precision floating point data and 32-bit vector single-precision floating point data.

15. The computer system of claim 11, wherein the machine instruction is inserted between a first instruction and a second instruction, the second instruction having a dependence on the first instruction, and the first instruction to produce data having a different format than a format used by the second instruction.

16. The computer system of claim 11, wherein (i) the first representation comprises a vector representation and the first format is 32-bit and the second representation comprises a scalar representation and the second format is 64-bit, or (ii) the first representation comprises a scalar representation and the first format is 64-bit and the second representation comprises a vector representation and the second format is 64-bit.

* * * * *